US006962394B2

(12) United States Patent
Anthony et al.

(10) Patent No.: US 6,962,394 B2
(45) Date of Patent: Nov. 8, 2005

(54) RESTRAINT COUPLING

(75) Inventors: James T. Anthony, Noblesville, IN (US); Michael A. Wiseman, Avon, IN (US); Guy R. Dingman, Westfield, IN (US); Steven T. Berenyi, Indianapolis, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 101 days.

(21) Appl. No.: 10/206,603

(22) Filed: Jul. 26, 2002

(65) Prior Publication Data

US 2003/0030310 A1 Feb. 13, 2003

Related U.S. Application Data

(63) Continuation-in-part of application No. 09/472,258, filed on Dec. 27, 1999, now Pat. No. 6,425,632, which is a continuation-in-part of application No. 09/133,590, filed on Aug. 18, 1998, now Pat. No. 6,017,087.
(60) Provisional application No. 60/307,899, filed on Jul. 26, 2001, and provisional application No. 60/394,099, filed on Jul. 5, 2002.

(51) Int. Cl.[7] ................................................ B60N 2/28
(52) U.S. Cl. ........................ 297/253; 297/250.1; 24/633
(58) Field of Search ............................. 297/250.1, 253; 24/633

(56) References Cited

U.S. PATENT DOCUMENTS

| 2,549,841 A | 4/1951 | Morrow et al. |
| 2,856,663 A | 10/1958 | Elsner |
| 2,938,254 A | 5/1960 | Gaylord |
| 3,128,520 A | 4/1964 | Carter et al. |
| 3,414,947 A | 12/1968 | Holmberg et al. |

(Continued)

FOREIGN PATENT DOCUMENTS

| DE | 198 48 231 | | 8/1999 | |
| DE | 19848231 A | * | 8/1999 | ............. F16B/1/02 |
| EP | 0 619 201 A1 | | 10/1994 | |
| EP | 0 619 202 A1 | | 10/1994 | |
| EP | 0982182 | | 3/2000 | |
| EP | 1059194 | | 12/2000 | |

OTHER PUBLICATIONS

"SafeGuard Child Protection, Seat Attachment Systems" brochure, IMMI, 2001, 5 pages.
"SafeGuard Child Seat Attachment Systems", IMMI, 1999, 2 pages.
"SafeGuard Buckle Up With Confidence", IMMI, 2002, 13 pages.
Order of Reference of United States Magistrate Judge regarding Discovery dated Dec. 3, 2003.
Order regarding Memorandum dated Dec. 2, 2003.
Memorandum dated Dec. 2, 2003.
Indiana Mills' Answers to Galbreath's Interrogatories Second Set dated Dec. 2, 2003.

(Continued)

Primary Examiner—Anthony D. Barfield
(74) Attorney, Agent, or Firm—Barnes & Thornburg

(57) ABSTRACT

A coupling to attach a device such as an infant seat to an anchor member. One version of the coupling is characterized by a frame having a mouth with a seat configured to receive the anchor member and a lever movably mounted on the frame to hold the anchor member inside the mouth. The lever has a downwardly projecting finger that blocks the mouth of the notch in the closed position and allows access to the notch when moved to the open position. The coupling may include a stop member to resist movement from the closed to the open position. The coupling also may include a web adjuster or other connecting device operatively disposed between the coupling and the device.

47 Claims, 26 Drawing Sheets

U.S. PATENT DOCUMENTS

| | | |
|---|---|---|
| 3,540,091 A | 11/1970 | Marosy |
| 4,136,422 A | 1/1979 | Ivanov et al. |
| 4,184,234 A | 1/1980 | Anthony et al. |
| 4,525,901 A | 7/1985 | Krauss |
| 4,660,889 A | 4/1987 | Anthony et al. |
| 4,876,770 A | 10/1989 | Bougher |
| 4,919,484 A | 4/1990 | Bougher et al. |
| 5,031,962 A | 7/1991 | Lee |
| 5,377,386 A | 1/1995 | Griffith |
| 5,471,714 A | 12/1995 | Olson |
| 5,487,588 A | 1/1996 | Burleigh et al. |
| 5,669,663 A | 9/1997 | Feuerherdt |
| 5,695,243 A | 12/1997 | Anthony et al. |
| 5,774,947 A | 7/1998 | Anscher |
| 5,890,762 A | 4/1999 | Yoshida |
| 5,915,630 A | 6/1999 | Step |
| 5,979,982 A | 11/1999 | Nakagawa |
| 6,209,957 B1 | 4/2001 | Baloga et al. |
| 6,494,535 B2 | 12/2002 | Galbreath |

OTHER PUBLICATIONS

Deposition of: John Galbreath dated Dec. 10, 2003.

Burlington Coat Factory's Answer to Galbreath's Interrogatories First Set dated Oct. 14, 2003.

Burlington Coat Factory's Responses to Galbreath's First Request for Production of Documents dated Oct. 14, 2003.

Indiana Mills and Manufacturing's Responses to Galbreath's First Request for Production of Documents dated Oct. 14, 2003.

Indiana Mills and Manufacturing's Answers to Galbreath's Interrogatories First Set dated Oct. 14, 2003.

Indiana Mills Supplemental Answer to Interrogatory No. 19 dated Dec. 19, 2003.

Burlington Coat Factory's Supplemental Answer to Interrogatory No. 16 Dec. 19, 2003.

John A. Galbreath's First Request for Admission from Defendant and Counterclaim Plaintiff Burlington Coat Factory Warehouse of Arundel dated Dec. 15, 2003.

John A. Galbreath's First Request for Admission from Counterclaim Plaintiff Indiana Mills and Manufacturing dated Dec. 15, 2003.

IMMI's Responses to Galbreath's Motion to Compel Additional Answers to Interrogatories dated Dec. 15, 2003.

Burlington Coat Factory Warehouse of Arundel Answers to Galbreath's Interrogatories Second Set dated Dec. 4, 2003.

Burlington Coat Factory Warehouse of Arundel Responses to Galbreath's Second Request for Production of Documents dated Dec. 4, 2003.

John A. Galbreath's Interrogatories to Indiana Mills and Manufacturing Secons Set dated Nov. 6, 2003.

Reply Memorandum in Support of Counterclaim Defendants' Motion for a Protective Order to Stay Discovery on Count III until the Court Decides Defendants' Pending Motion to Dismiss dated Nov. 5, 2003.

Notice of Service dated Nov. 5, 2003.

Plaintiff and Counterclaim Defendant John A. Galbreath's Second Request for Production of Documents to Counterclaim Plaintiff Indiana Mills and Manufacturing dated Nov. 5, 2003.

IMMI's Response to Galbreath and Bright Ideas' Motion for Protective Order to Stay Discovery on Count III dated Oct. 22, 2003.

Memorandum of Points and Authorities in Support of Counterclaim Defendants' Motion for a Protective Order to Stay Discovery on Count III until the Court Decides Defendants' Pending Motion to Dismiss dated Oct. 17, 2003.

Counterclaim Defendants' Motion for a Protective Order to Stay Discovery on Count III until Court Decides Defendants' Pending Motion to Dismiss dated Oct. 17, 2003.

Counterclaim Defendant the Bright Ideas Co.'s Responses to Defendant/Counterclaim Plaintiff's First Set of Request for Production dated Oct. 17, 2003.

Counterclaim Defendant The Bright Ideas Co.'s Responses to Defendant/Counterclaim Plaintiff's First Set of Interrogatories dated Oct. 17, 2003.

Plaintiff and Counterclaim Defendant John A. Galbreath's Responses to Defendant/Counterclaim Plaintiffs' First Set of Requests for Production dated Oct. 17, 2003.

Plaintiff and Counterclaim Defendant John A. Galbreath's Responses to Defendant/Counterclaim Plaintiffs' First Set of Interrogatories dated Oct. 17, 2003.

Order on motion for Extension of Time to File Answer dated Apr. 22, 2003.

Burlington Coat Factory Warehouse of Arundel, Inc.'s Motion for Twenty–Day Extension of Time to File its Answer dated Apr. 4, 2003.

Complaint dated Mar. 3, 2003.

Burlington Coat Factory's Amended Answers to Galbreath's Interrogatories First Set dated Nov. 20, 2003.

Motion for Admission *Proc Hac Vice* for Donald Knebel is Granted dated Nov. 14, 2003.

Indiana Mills' Amended Answers to Galbreath's Interrogatories First Set dated Nov. 14, 2003.

Stipulated Order regarding Confidentiality of Discovery Matrial dated Nov. 13, 2003.

Indiana Mills' Amended Responses to Galbreath's First Request for Production of Documents dated Nov. 13, 2003.

Motion for Admission *Pro Hac Vice*/Donald Knebel dated Nov. 11, 2003.

John A. Galbreath's Second Request for Production of Documents to Burlington Coat Factory Warehouse of Arundel dated Nov. 8, 2003.

John A. Galbreath's Interrogatories to Burlington Coat Factory Warehouse of Arundel Second Set dated Nov. 8, 2003.

Counterclaim Plaintiff IMMI's Opposition to Counterclaim Defendant Galbreath's Motion to Dismiss and IMMI's Concurrent Motion for Leave to Amend the Answer and Counterclaim dated Jun. 6, 2002.

Counterclaim Plaintiff IMMI's Opposition to Counterclaim Defendant Bright Idea's Motion to Waive Local Rule 101.1(a) or in the Alternative for Extension of Time to Obtain Attorney dated Jun. 6, 2003.

Answer and Amended Counterclaim dated Jun. 6, 2003.

Answer dated May 22, 2003.

Letter to John A. Galbreath requesting original signature dated May 5, 2003.

Memorandum of Points and Authorities in Support of Counterclaim Defendant Bright Ideas' Motion to Dismiss.

Counterclaim Defendant Bright Ideas' Motion to Dismiss May 16, 2003.

Affidavit dated May 16, 2003.

Counterclaim Defendant Bright Ideas' Motion to Waive Local Rule 101.1(a) or in the Alternative for Extension of Time to Obtain Attorney.

Counterclaim Defendant Bright Ideas' Motion to Waive Local Rule 101.1(a) or in the Alternative for Extension of Time to Obtain Attorney dated May 16, 2003.
Counterclaim Defendant Bright Ideas' Disclosure of Affiliations and Financial Interest dated May 16, 2003.
Motion for Admission *Pro Hac Vice* dated Apr. 25, 2003.
Defendant/Counterclaim Plantiffs' First Set of Requests for Production to Plaintiff/Counterclaim Defendant Galbreath dated Jul. 21, 2003.
Defendant/Counterclaim Plantiffs' First Set of Interrogatories to Counterclaim Defendant the Bright Ideas Company, Inc. dated Jul. 21, 2003.
Response to Counterclaim Defendants' Motion to Dismiss IMMI's Tortious Interference Counterclaim dated Jul. 21, 2003.
Defendant/Counterclaim Plantiffs' First Set of Interrogatories to Counterclaim Defendant Galbreath dated Jul. 21, 2003.
Memo to Counsel RE: *John Galbreath v. Burlington Coat Factory Warehouse of Arundel, Inc.*, Civil No. CCB–03–555 dated Jul. 10, 2003.
Memorandum of Points and Authorities in Support of Counterclaim Defendants' Motion to Dismiss Indiana Mills and Manufacturing, Inc.'s Tortious Interference Counterclaim.
Counterclaim Defendants' Motion to Dismiss Indiana Mills and Manufacturing, Inc.'s Tortious Interference Counterclaim dated Jul. 3, 2003.
Answer dated Jul. 3, 2003.
Entry of Appearance dated Jun. 30, 2003.
Order dated Jun. 10, 2003.
Counterclaim Plaintiff IMMI's Opposition to Counterclaim Defendant Bright Idea's Motion to Dismiss and IMMI's Concurrent Motion for Leave to Amend the Answer and Counterclaim dated Jun. 6, 2003.
Disclaimer in Patent Under 37 CFR 1.321(a) dated Dec. 31, 2003.
Order.
Plaintiff and Counterclaim Defendant John A. Galbreath's Interrogatories to Counterclaim Plaintiff Indiana Mills and Manufacturing, Inc., First Set dated Sep. 8, 2003.
Plaintiff and Counterclaim Defendant John A. Galbreath's First Request for Production of Documents to Counterclaim Plaintiff Indiana Mills and Manufacturing, Inc. dated Sep. 8, 2003.
Plaintiff and Counterclaim Defendant John A. Galbreath's First Request for Production of Documents to Counterclaim Plaintiff Burlington Coat Factory Warehouse of Arundel, Inc. dated Sep. 8, 2003.
Plaintiff and Counterclaim Defendant John A. Galbreath's Interrogatories to Defendant and Counterclaim Plaintiff Burlington Coat Factory Warehouse of Arundel, Inc. dated Sep. 8, 2003.
Initial Report on Whether There is Unanimous Consent to Proceed Before a United States Magistrate Judge dated Aug. 22, 2003.
Joint Request for Settlement/ADR Conference dated Aug. 22, 2003.
Scheduling Order.
Reply Memorandum in Support of Counterclaim Defendant's Motion to Dismiss Indiana Mills and Manufacturing, Inc.'s Tortious Interference Counterclaim dated Aug. 4, 2003.
Defendant/Counterclaim Plantiff's First Set of Requests for Production to Counterclaim Defendant Bright Ideas Company dated Jul. 21,2003.

* cited by examiner

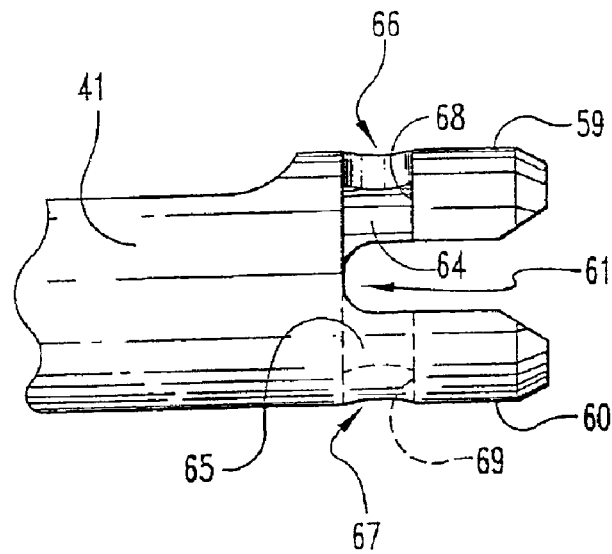
Fig. 5
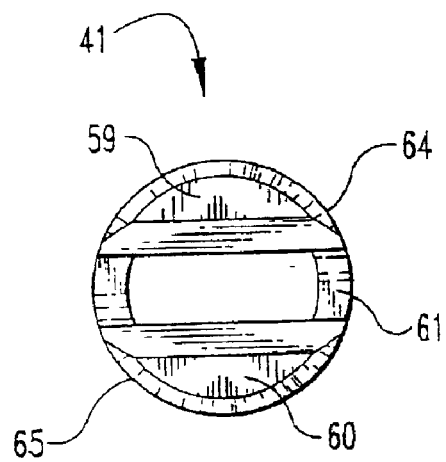 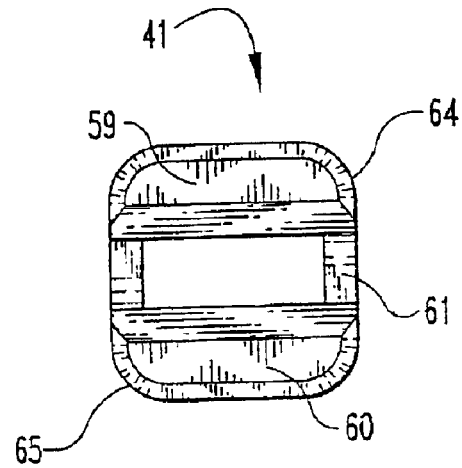
Fig. 6  Fig. 7

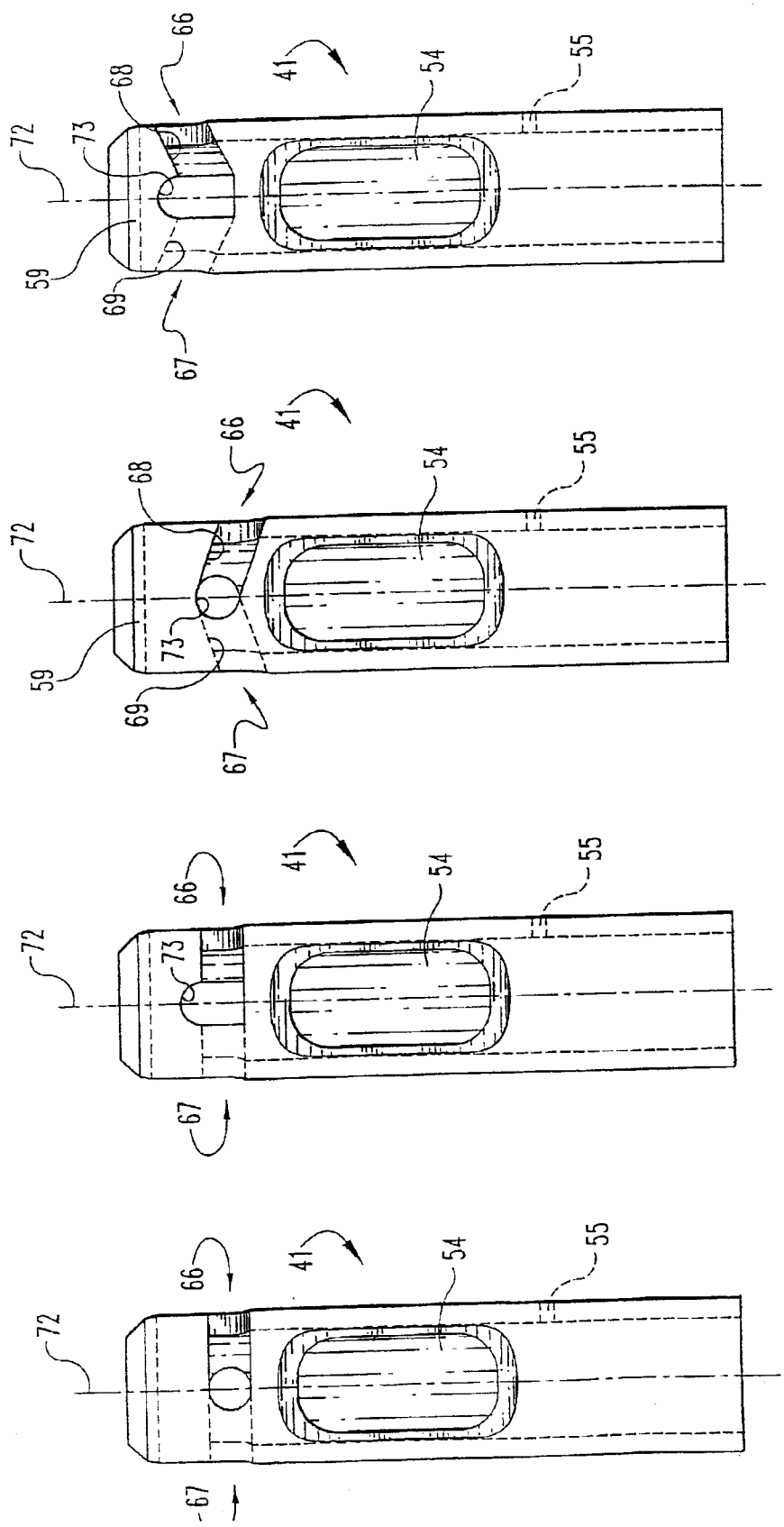

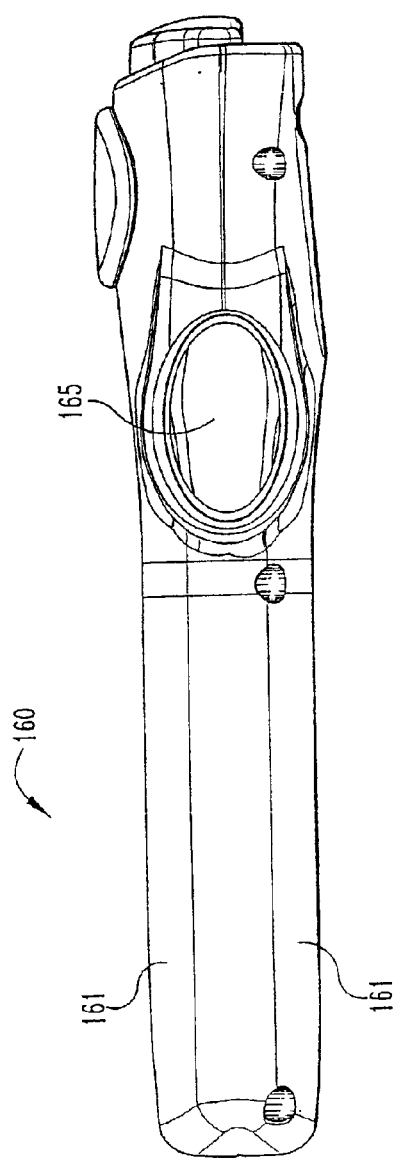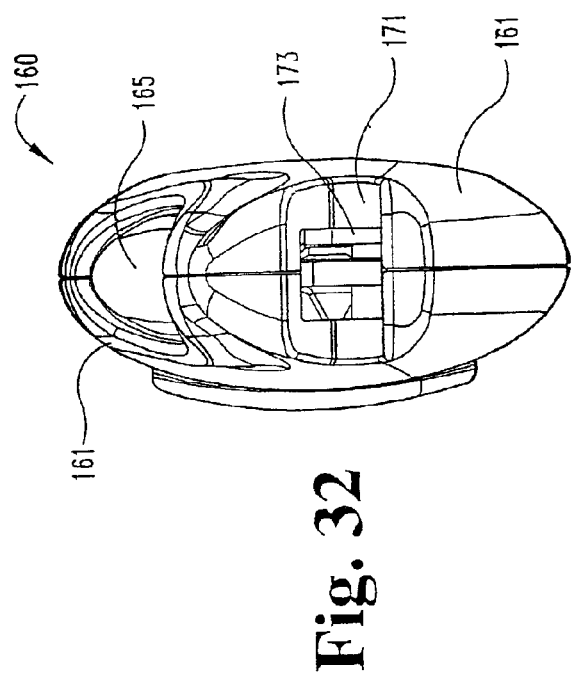

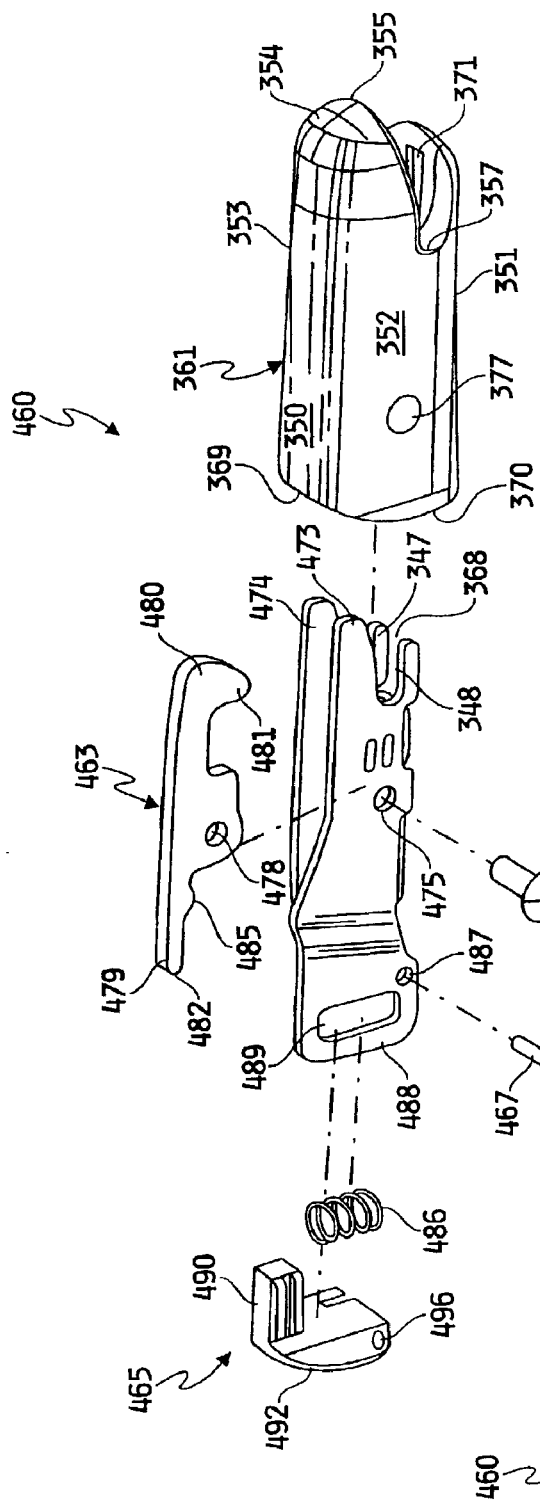
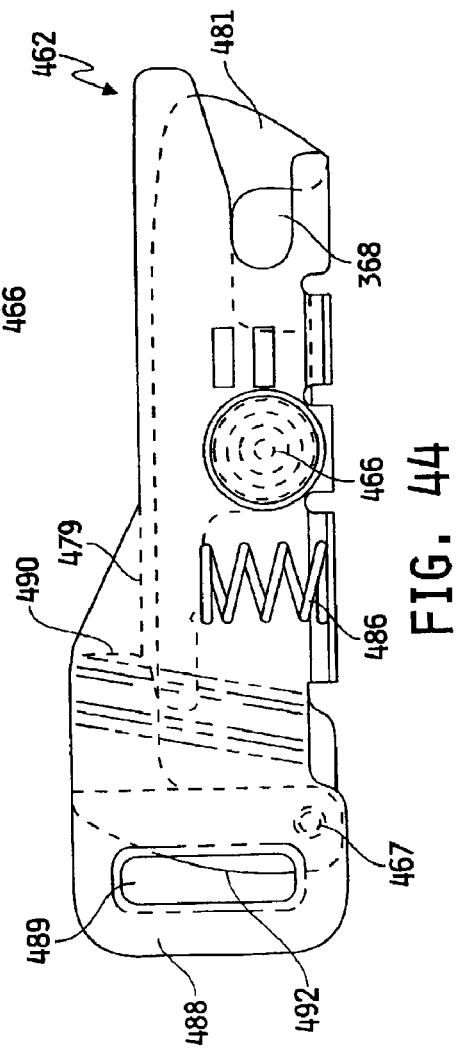

RESTRAINT COUPLING

This application is a continuation-in-part of application Ser. No. 09/472,258 filed, Dec. 27, 1999, which is scheduled to issue as U.S. Pat. No. 6,425,632 to Anthony et al. on Jul. 30, 2002, and which is a continuation-in-part of application Ser. No. 09/135,908, filed Aug. 18, 1998, which issued as U.S. Pat. No. 6,017,087 to Anthony et al. on Jan. 25, 2000, and this application claims priority to, and the benefit of U.S. Provisional Patent Application No. 60/307,899, filed Jul. 26, 2001, and Provisional application Ser. No. 60/394,099, filed Jul. 5, 2002, the disclosure of which is expressly incorporated herein by reference.

FIELD OF THE INVENTION

This invention relates to connections that secure a child's seat to the passenger seat of a vehicle and to couplings that attach restraints to anchor members.

BACKGROUND AND SUMMARY OF THE INVENTION

This invention relates generally to coupling devices for attaching a device, such as a child seat, to an anchor point using a web or belt. One known pertinent prior art is commonly owned U.S. Pat. No. 5,695,243 to Anthony et al., the disclosure of which is specifically incorporated into this specification by reference.

It is desirable to provide a coupling device configured to releasably engage an anchor member. In one embodiment it is desirable to include a stop mechanism to limit disengagement of the anchor member. Some of the illustrative embodiments have profiles that fall within the rules mandated by FMVSS 225, found in 49 CFR 571.225, and FMVSS 213, which are incorporated herein by reference.

In one aspect, this invention is a child restraining device for mounting in the passenger seat of a vehicle that has at least one rigid member fixedly mounted in the bite between the passenger seat's seat portion and back portion. In particular, the child restraining device of this invention has a child seat and at least one coupling to attach the child seat to the rigid member. The coupling is characterized by a frame having a notch on its distal end with a mouth/seat that is adapted to receive the fixedly mounted rigid member and a lever that is pivotally mounted inside the frame to hold the rigid member inside the mouth. The lever has a downwardly projecting finger that blocks the mouth of the notch when moved in one direction and allows access to the mouth when moved in the other direction. The coupling is further characterized by a biasing means to hold the coupling in a normally closed position and a means, such as the above-described web adjuster, for securing the coupling to the child seat.

In another aspect, this invention is a coupling device for attachment to an anchor member. In particular, the coupling is characterized by a frame having a distal end including a mouth having a seat that is configured to receive the anchor member and a lever that is movably mounted to the frame to hold the anchor member inside the mouth. The lever has a downwardly projecting finger that covers the mouth when moved in one direction and allows access to the mouth when moved in the other direction. The coupling is further characterized by a biasing member or spring to urge the coupling into a normally closed position. The coupling also may include anchor aperture to receive a connector, such as a length of web, to operatively mount the coupling to a device desired to be connected by the coupling.

In yet another aspect, this invention is a coupling device for attachment to an anchor member. In particular, the coupling is characterized by a frame having a distal end including a mouth having a seat that is configured to receive the anchor member and a lever that is movably mounted to the frame to hold the anchor member inside the mouth. The lever has a downwardly projecting finger that covers the mouth when moved in one direction and allows access to the mouth when moved in the other direction. The lever also has an engagement portion which engages a stop member provided on the frame to resist the movement of the lever from the closed, or covered position. The coupling is further characterized by a biasing member or spring to urge the coupling into a normally closed position. The coupling also may include anchor aperture to receive a connector, such as a length of web, to operatively mount the coupling to a device desired to be connected by the coupling.

In another aspect, this invention is a coupling device for attachment to an anchor member. In particular, the coupling is characterized by a frame having a distal end including a mouth having a seat that is configured to receive the anchor member and a lever that is movably mounted to the frame to hold the anchor member inside the mouth. The lever has a downwardly projecting finger that covers the mouth when moved in one direction and allows access to the mouth when moved in the ocher direction. The coupling is further characterized by a biasing member or spring to urge the coupling into a normally closed position. The coupling also may include an anchor aperture to receive a connector, such as a length of web, to operatively mount the coupling to a device desired to be connected by the coupling.

BRIEF DESCRIPTION OF THE DRAWINGS

FIG. 5 is a side view of the distal end of a rotary coupling according to one embodiment of the present invention.

FIG. 6 is an end view of the distal end of a rotary coupling according to one embodiment of the present invention.

FIG. 7 is an end view of the distal end of a rotary coupling according to one embodiment of the present invention.

FIGS. 8, 9, 10, and 11 are plan views alternative embodiments of a cylinder that may be used in a rotary coupling according to the present invention.

FIGS. 29–32 are respectively perspective, top, side, and end views of a connector according to one embodiment of the present invention.

FIG. 43 is an exploded view of a connector according to one embodiment of the present invention.

FIG. 44 is a side view in partial phantom of a connector in the closed position according to one embodiment of the present invention.

DESCRIPTION OF THE ILLUSTRATIVE EMBODIMENTS

Figure 1:
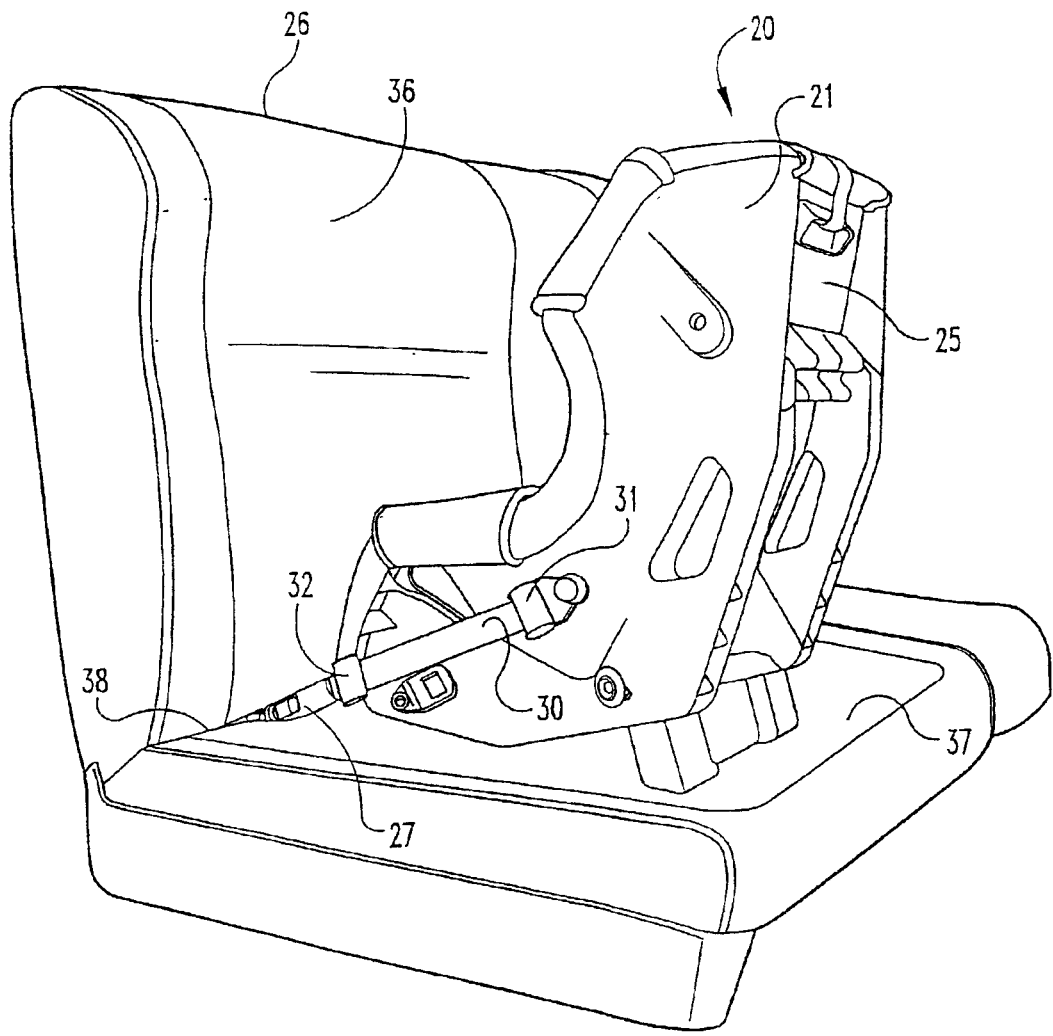
FIG. 1 is a perspective view of a passenger seat and a rearwardly facing child seat incorporating one embodiment of the present invention.

For the purpose of promoting an understanding of the principles of this invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein are contemplated as would normally occur to one of average skill in the art to which the invention relates.

Referring to FIG. 1, child's infant seat 20 is shown placed on top of automobile seat 26. Seat 20 includes a plastic main body 21 that is molded to receive a child in the sitting position. the seat portion is generally concave in configuration and is integrally joined to back portion 25. For the child's comfort, a flexible and washable cushion preferably resides over both the seat and back portions.

Seat 20 is coupled by one, or alternatively at least two, rotary coupling(s) 27 to passenger seat 26 with a separate web or belt 30 tying or securing each coupling to seat 20. For clarity, only one rotary coupling 27 is shown in FIG. 1. However, a second coupling, similar to the one that is shown, can be mounted on the other side of seat 20. the proximal end of web 30 includes a conventional web adjuster 31 that is mounted, optionally with a pivot, to seat 20. An example of such a web adjuster is described in U.S. Pat. No. 4,660,889 to Anthony et al., U.S. Pat. No. 5,031,962 to Lee, or U.S. Pat. No. 4,876,770 to Bougher, the disclosures of which are specifically incorporated into the specification by reference. The distal end of web or belt 30 is then attached to the proximal end of rotary coupling 27 in any conventional manner, such as with pins, rivets, stitching, or another web adjuster 32. If web adjuster 32 is used, one may omit web adjuster 31 and mount the proximal end of web 30 directly to seat 20. Upon attachment to seat 20. web adjuster 31 may then be used to adjust the tension or tightness of web 30 when seat 20 is attached to passenger seat 26.

Figure 3:
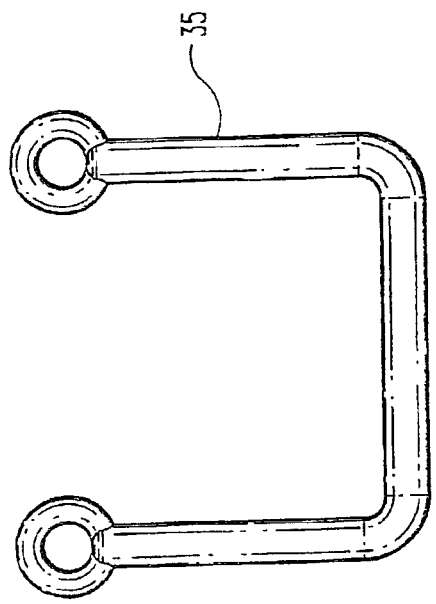
FIG. 3 is a plan view of a fixedly mountable rigid member.
Figure 2:
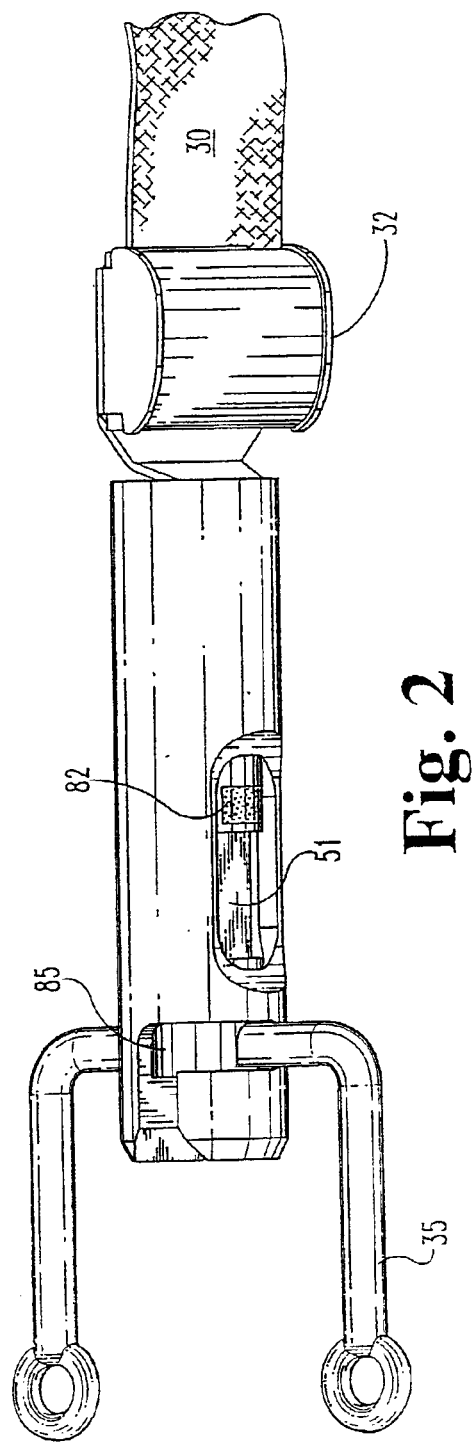
FIG. 2 is an enlarged perspective view of a rotary coupling attached to a fixedly mounted rigid member according to one embodiment of the present invention.

A closer view of rotary coupling 27 engaged to a fixedly mountable rigid member 35 is shown in FIG. 2. Referring back to FIG. 1, fixedly mountable rigid member 35 (not shown) can be mounted in most any conventional manner to passenger seat 26 in bite 38 between back support 36 and seat support 37. In general, at least one rigid member 35 is mounted in seat bite 38 for every rotary coupling 27 that is used to attach infant seat 20 to passenger seat 26, generally one on each side of seat 20. And referring to FIG. 3, rigid member 35 is typically round in cross-section of which one example is an Anchorage World Universal 6-millimeter bar.

Figure 4:
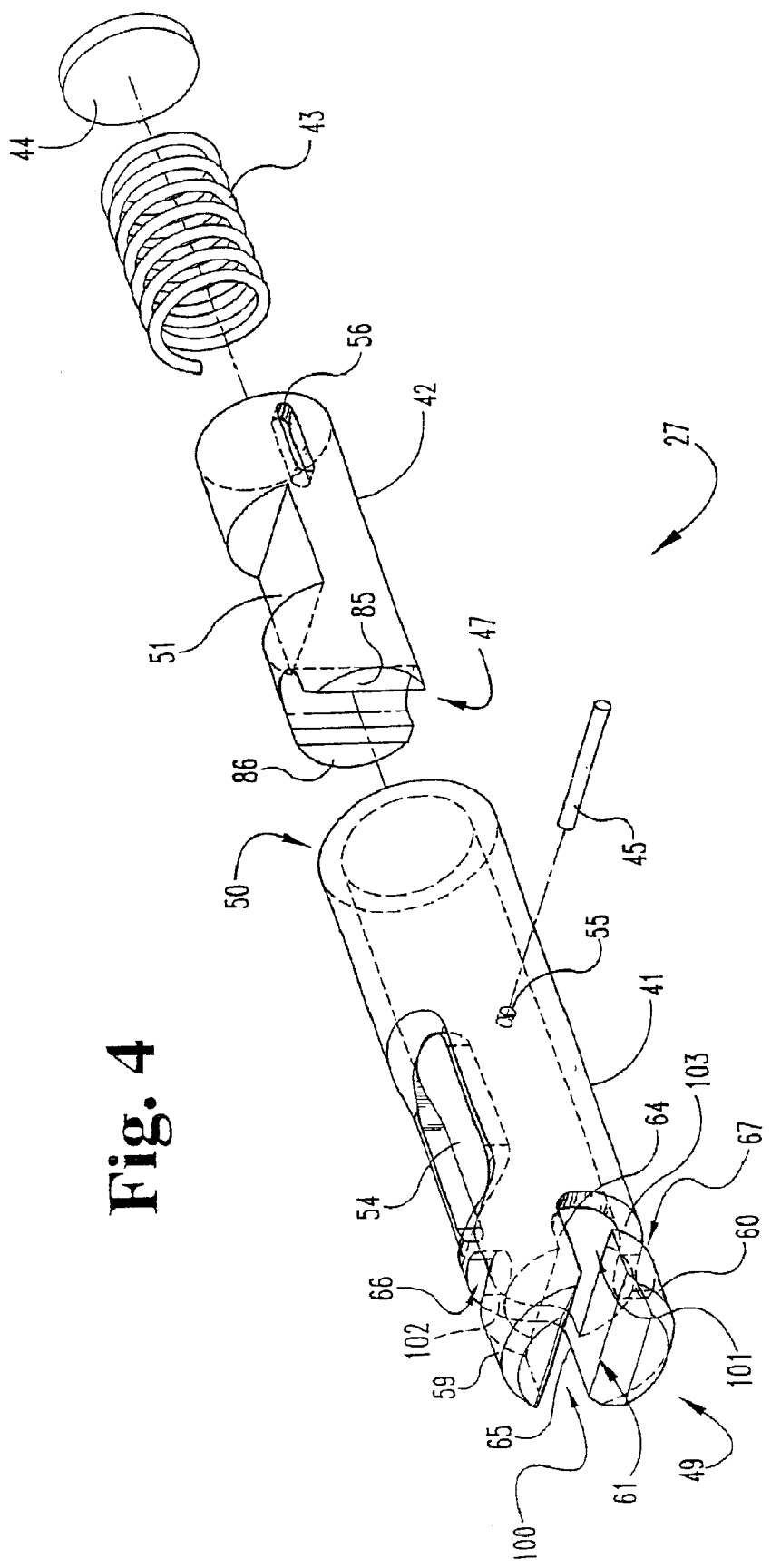
FIG. 4 is an exploded view of a rotary coupling according to one embodiment of the present invention.

An exploded view of rotary coupling 27 is presented in FIG. 4. Rotary coupling 27 generally includes rigid hollow cylinder 41, piston 42 spring 43, end 44, and pin 45. Rotary coupling 27 is assembled by sliding piston 42, external end 47 first, inside rigid hollow cylinder 41. Once inside, piston 42 has sufficient clearance to allow it to reciprocally slide inside rigid hollow cylinder 41, between distal end 49 and proximal end 50. Piston 42 further includes a finger groove 51, which is aligned with access opening 54 and which is adapted to receive a human finger. Finger groove 51 is then maintained in alignment with access opening 54 by pin 45 that extends through hole 55 and into guide groove 56. A spring 43 or other biasing means is then placed behind piston 42 to urge piston 42 toward the distal end 49. Thereafter, end 44 is placed behind spring 43 to hold both spring 43 and piston 42 in position. End 44 can be attached to rigid hollow cylinder 41 in most any conventional fashion, for example, as by welding end 44 to cylinder 41.

Optionally and once the rotary coupling is assembled, a raised button (not shown) adapted to receive a human finger can be attached to piston 42 through access opening 54, over finger groove 51. The raised button can then be used to both manually slide piston 42 inside cylinder 41 and maintain piston 42 in alignment with rigid cylinder 42 by sliding against the sides of access opening 54. Accordingly if the raised button is present, one may omit pin 45 and alignment groove 56 from the rotary coupling shown in FIG. 4.

A side view of distal end 49 on rigid hollow cylinder 41 is presented in FIG. 5 and an end view of distal end 49 is presented in FIG. 6. Simultaneously viewing these figures and FIG. 4, two fingers, 59 and 60, are laterally attached by their opposite proximal ends, 64 and 65, across the open end 61 of cylinder 41. Fingers 59 and 60 are attached slightly spaced from open end 61, which forms notches, 66 and 67, between the proximal edge of each finger, 68 and 69, and open end 61. Notches 66 and 67 are mutually opposed and include respectively slots 100 and 101 extending in the direction of the longitudinal axis of cylinder 41. Slots 100 and 101 open respectively into slots 102 and 103 extending around the cylinder's longitudinal axis. As presented below, fingers 59 and 60 and notches 66 and 67, are generally used to attach the rotary coupling to fixedly mounted member 35. However, if fingers 59 and 60 are optionally mounted over open end 61 as shown, fingers 59 or 60 can also serve to hold piston 42 inside a the rotary coupling when the coupling is not engaged to a fixedly mounted member 35 since the wall thickness 104 of fingers 59 and 60 is greater than the wall thickness of cylinder 41.

FIG. 7 presents an alternative embodiment of rigid hollow cylinder 41. Besides the circular cross-section shown in FIG. 6, cylinder 41 and piston 42 may also be generally square, as shown, as well as have other non-circular cross-sections such as hexagonal, octagonal, or even oval. And should the practitioner choose a non-circular cross-section, the practitioner may again remove pin 45 and groove 56 from coupling 27. Being non-circular, the mating sides of cylinder 41 and a complementarily shaped piston 42 may be used to maintain cylinder 41 and piston 42 in proper alignment.

FIG. 8 presents a plan view of rigid hollow cylinder 41—as shown in previous figures with notches 66 and 67 that are generally perpendicular to longitudinal axis 72. However besides perpendicular, the notches may also take other forms. For example and referring to FIG. 9, notches 66 and 67 may also include a seat 73 that is adapted to receive rigid member 35, when rotary coupling 27 is engaged to rigid member 35. Or referring to FIGS. 10 and 11, the proximal edges, 68 and 69, of fingers 59 and 60 may also be oriented at an oblique angle to longitudinal axis 72, which similarly offers a seat 73 against which rigid member 35 may reside.

Figure 12:
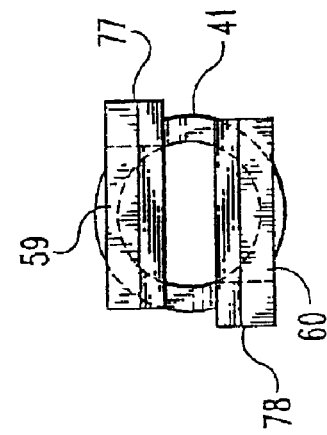
FIGS. 12, 13, and 14 are respectively end, side, and top view of one embodiment of the present invention.
Figure 14:
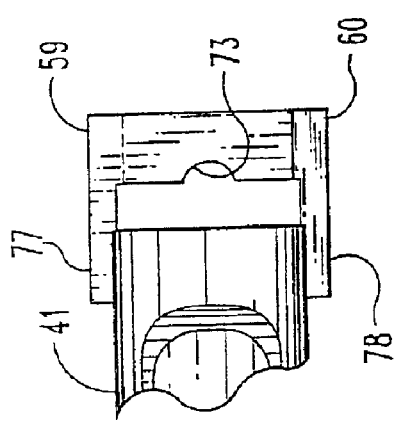
Figure 13:
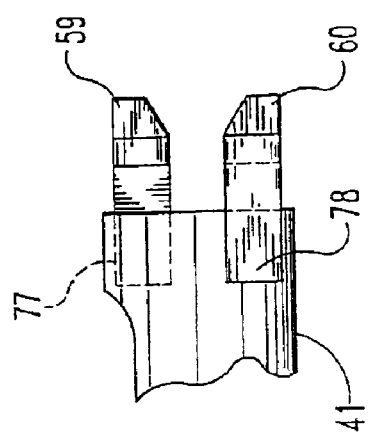

Referring now to FIGS. 12, 13, and 14 there is shown an alternative embodiment to attaching fingers 59 and 60 to rigid hollow cylinder 41. In previous figures, fingers 59 and 60 were presented contiguous to rigid hollow cylinder 41; that is, fingers 59 and 60 were shown cut or molded into the same piece of material as cylinder 41. Alternatively, fingers 59 and 60 may start as separate pieces and then be attached to rigid hollow cylinder 41 in any conventional manner such as welding legs 77 and 78, which are attached to fingers 59 and 60, to opposite sides of cylinder 41.

Figure 15:
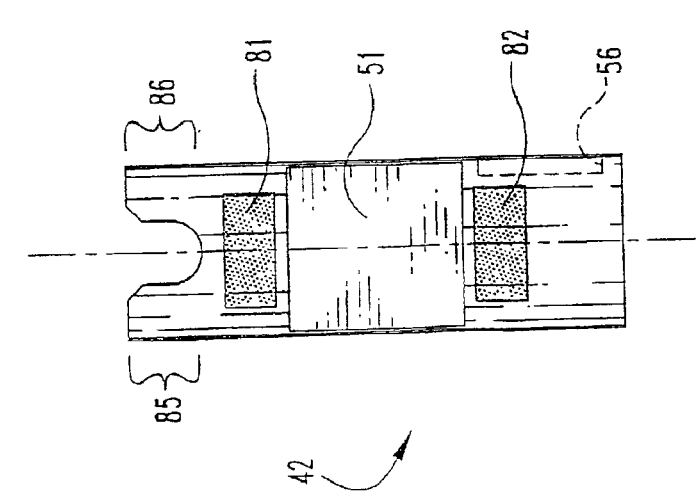
Figure 18:
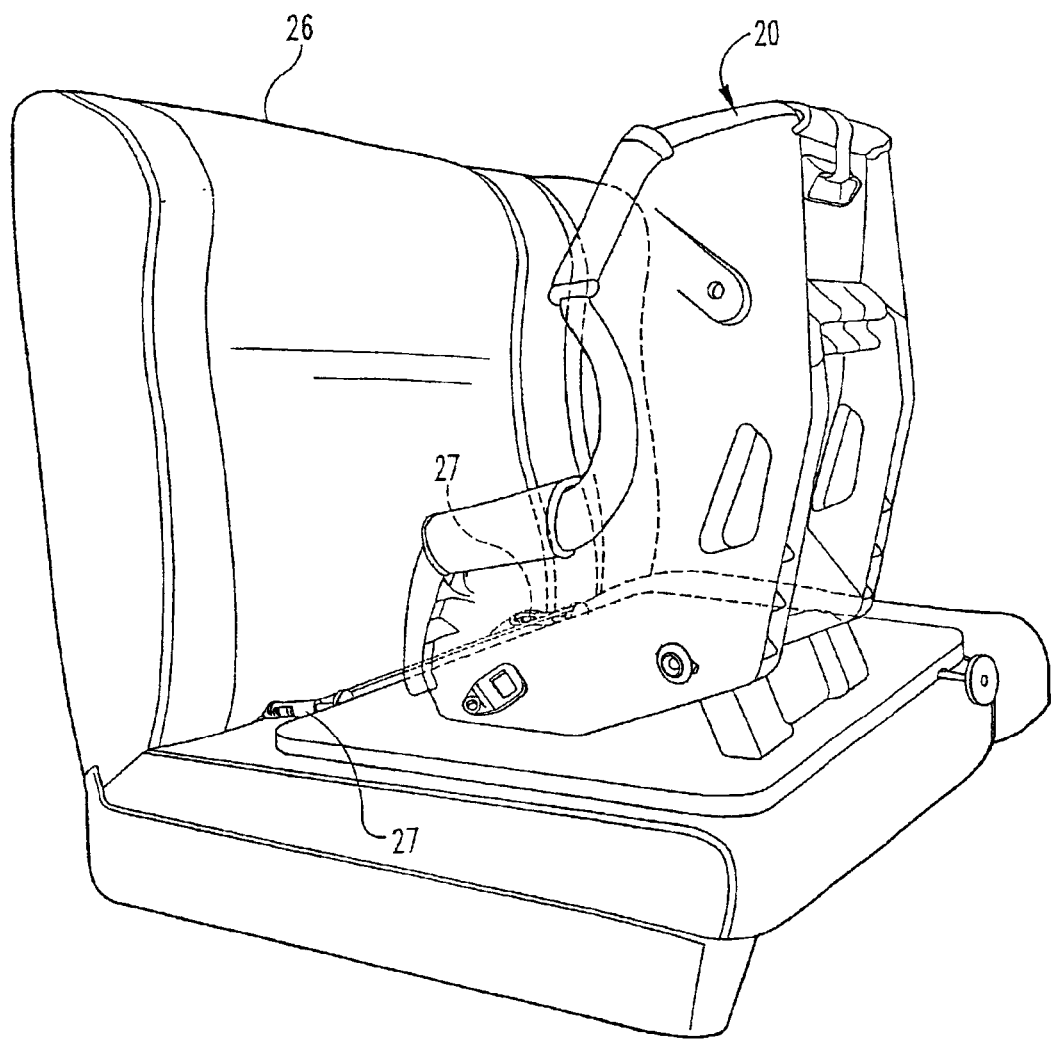
FIG. 18 is a perspective view of a passenger seat and a rearwardly facing child seat incorporating one embodiment of the present invention.

A plan view of piston 42 is presented in FIG. 15. Piston 42 optionally includes an indicator to inform the user when the piston is either proximally or distally displaced within rigid hollow cylinder 41. The indicator is provided by colored portions 81 and 82 located on piston 42. When proximally displaced, colored portion 81 is readily visible through access opening 54 and colored portion 82 is hidden under rigid hollow cylinder 41. Then when piston 42 is distally displaced, colored portion 82 becomes readily visible, and colored portion 81 becomes hidden. In this regard, it is contemplated that colored portions 81 and 52 have different colors to allow the user to know at a glance what position piston 42 resides.

Figure 17:
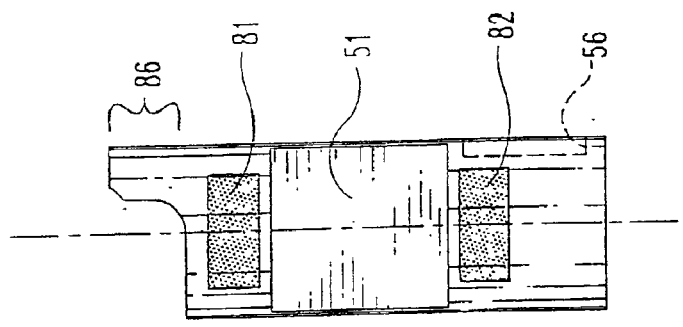
FIGS. 15, 16, and 17 are plan views of alternative embodiments of a piston that may be used in a rotary coupling according to the present invention.
Figure 16:
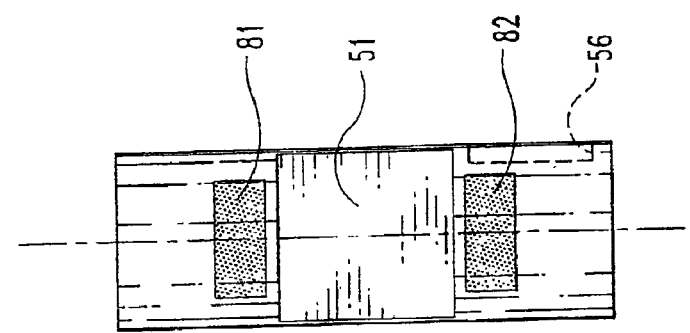

Still referring to FIG. 15, piston 42 optionally includes two pawl blocks, 55 and 86. Pawl blocks 85 and 86 are extensions of piston 42 forming a groove to contact rigid member 35. When coupling 27 is rotated, as described more fully below, member 35 is positioned within slots 102 and 103, and the groove contacts rigid member 35. With rotary coupling 27 and rigid member 35 thusly engaged, pawl blocks 55 and 86 reside on either side of member 35 and prevent member 35 from sliding out of either notch 66 or 67. FIG. 16 shows an alternative embodiment of the piston 42 that omits the pawl blocks, and FIG. 17 presents yet another alternative embodiment where only one pawl block, 86, is present.

Rotary coupling 27 is engaged to rigid member 35 by first placing rigid member 35 between fingers 59 and 60 and then pushing rotary coupling 27 against rigid member 35 until rigid member 35 becomes aligned with slots 102 and 103 of notches 66 and 67. This movement pushes piston 42 to a proximal position inside cylinder 41 and compresses spring 43. Once rigid member 35 is aligned with slots 102 and 103 of notches 66 and 67, the rotary coupling is twisted about its axis to place fixedly mounted rigid member 35 within slots 102 and 103 and then the coupling is released. With the coupling released, spring 43 decompresses and presses piston 42 against rigid member 35, which holds rigid member 35 within rotary coupling 27.

Rotary coupling 27 is then released from rigid member 35 by first accessing piston 42 through access opening 54 with a human finger. Once the human finger is located at groove 51, piston 42 can be pulled back to a proximal position within cylinder 41. With piston 42 located in a proximal position, spring 43 is recompressed and the spring's force against rigid member 35 is released. With the force released, rotary coupling 27 is then twisted around its longitudinal axis in a direction that is opposite of that which was previously used to engage coupling 27 and member 35. Rotary coupling 27 is then twisted until rigid member 35 exits slots 102 and 103 and is aligned with slots 100 and 101. Rigid member 35 is then slid past fingers 59 and 60, and out of out of rotary coupling 27.

Figure 19:
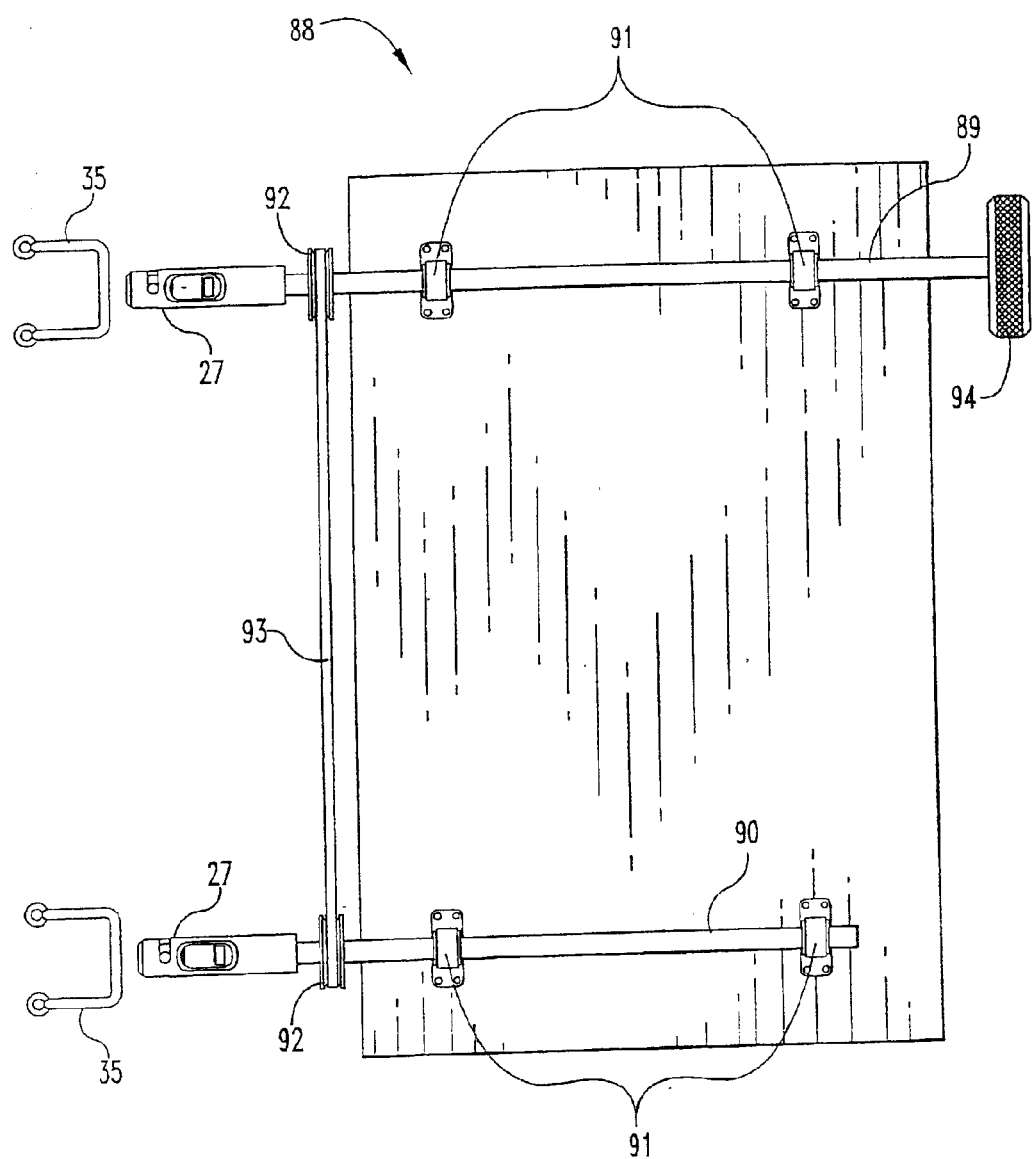
FIG. 19 is a plan view of a rigid plate according to one embodiment of the present invention.

Referring to FIG. 19, another embodiment of this invention is presented with infant seat 20 mounted in most any conventional manner atop rigid platform 88. The platform, rather than the seat, is then attached to passenger seat 26 by rotary couplings 27. Referring to FIG. 19, rigid platform 88 has two shafts, 89 and 90, which are rotatably attached through bearings 91 to platform 88. Shafts 89 and 90 each include a pulley or gear 92 that are mutually connected by a belt or chain 93. A rotary coupling, 27, is then mounted to the distal end of each shaft. Arranged in this fashion, both couplings can then be simultaneously twisted around their longitudinal axis by turning knob 94.

This latter embodiment is operated by aligning each rotary coupling 27 with a rigid member 35 that was previously mounted in the bite of a passenger seat. Each rigid member is then pushed between the fingers in each rotary coupling, which simultaneously pushes each piston 42 to a proximal position inside the coupling. The rigid members are pushed past the fingers until each rigid member aligns with the notches in its rotary coupling. Then once aligned, both rotary couplings are simultaneously twisted around each rigid member 35 by turning knob 94. Piston 42 and spring 43 in each rotary coupling then hold each rigid member 35 within notches 66 and 67, which in turn, securely holds the infant seat in the passenger seat of a vehicle. Optionally, belt 93 and pulleys 92 can be omitted from this embodiment and each shaft can be operated by a separate knob.

Figure 20:
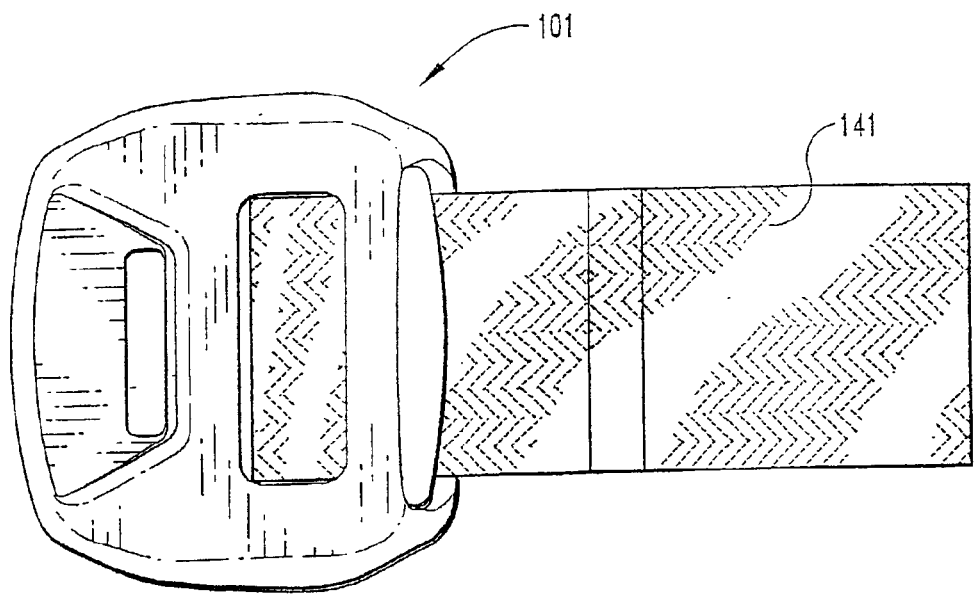
FIGS. 20–22 are respectively top, side, and cross-sectional views of a web adjuster according to one embodiment of the present invention.
Figure 21:
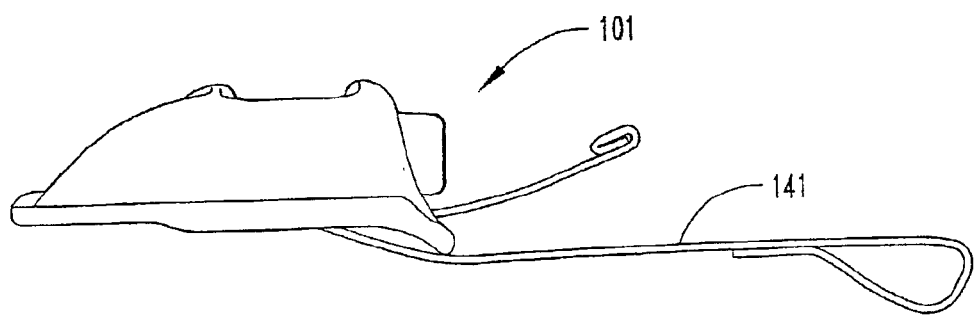
Figure 22:
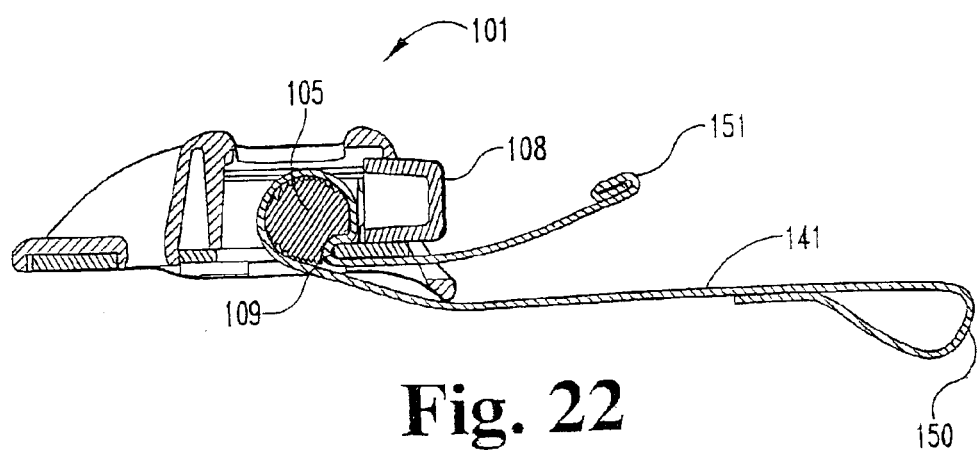
Figure 23:
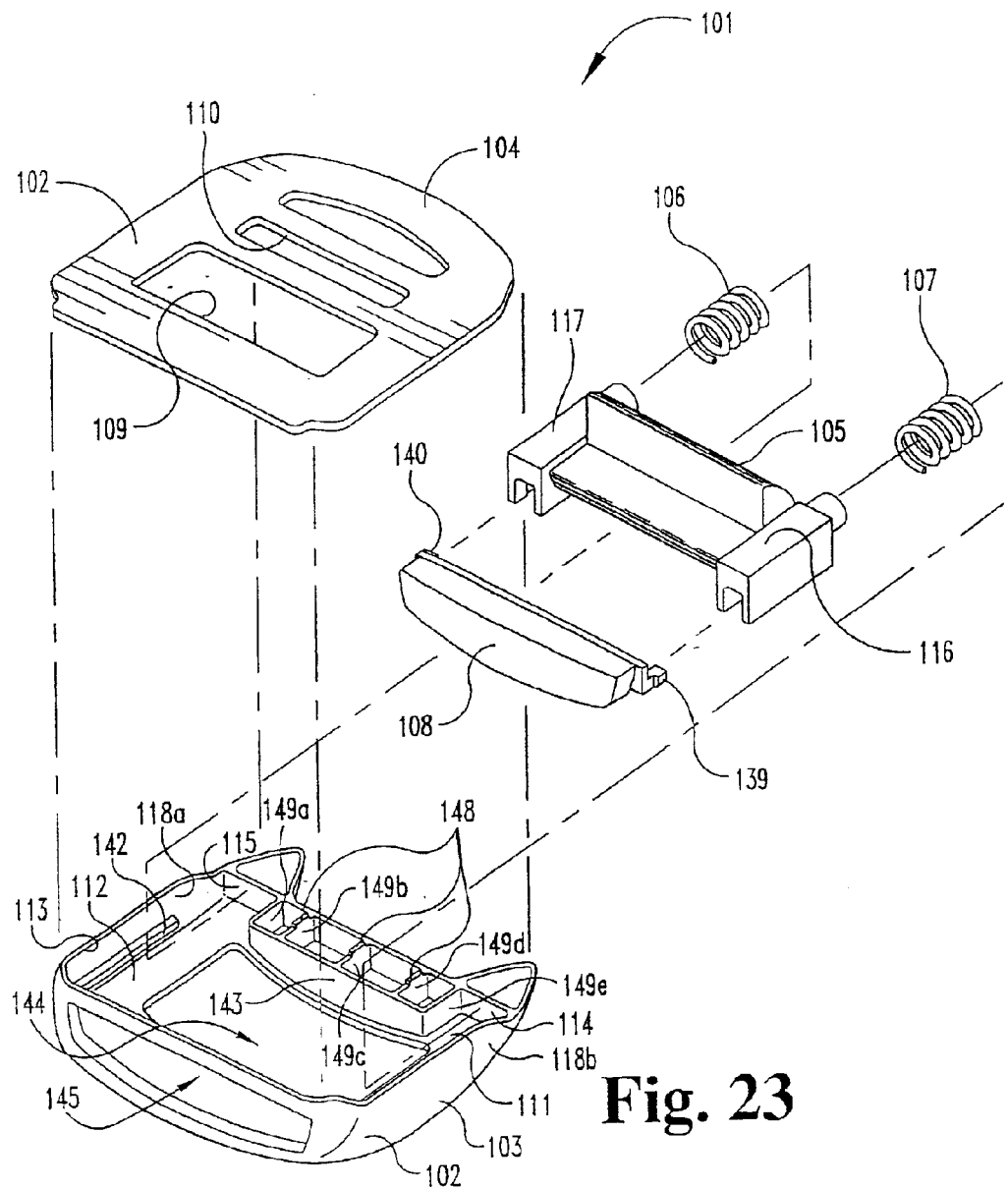
FIG. 23 is an exploded view of a web adjuster according to one embodiment of the present invention.
Figure 24:
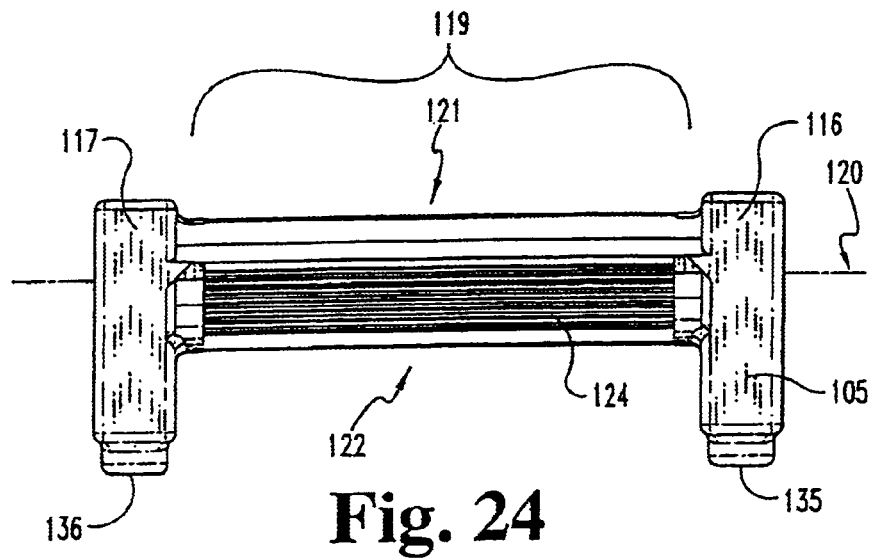
FIGS. 24–28 are respectively bottom, back, top, cross-sectional, and perspective views of a web gripping bar according to one embodiment of the present invention.
Figure 25:
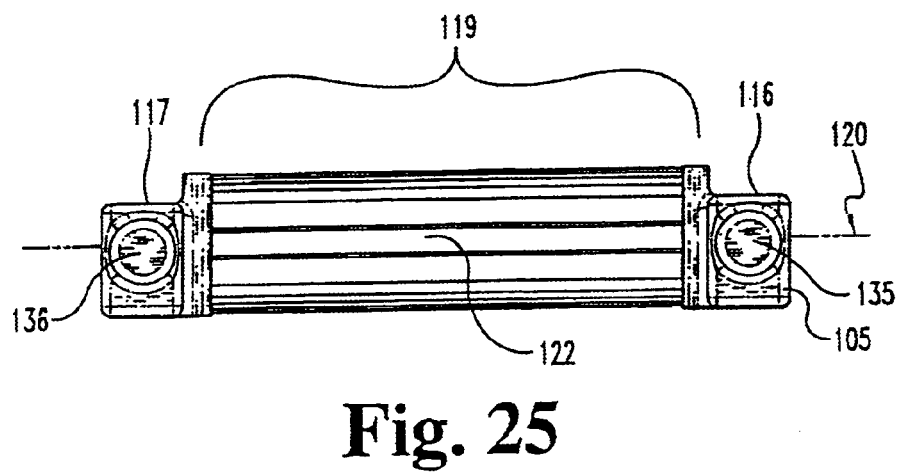
Figure 26:
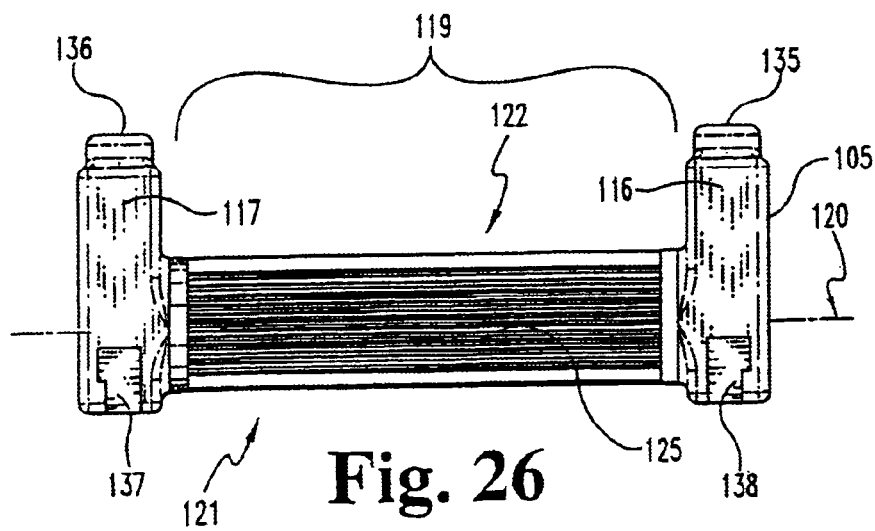

In addition to the conventional web adjusters, 31 and 32, shown in FIG. 1, one may also utilize web adjuster 101, shown in FIGS. 20–22 in this invention. Referring now more particularly to FIG. 23, there is shown an exploded view of web adjuster 101. Web adjuster 101 includes a bar 105, two springs 106 & 107, a button 108, a frame 102; which may be conceptually subdivided into housing 103 and plate 104; and a web 141, previously depicted in FIGS. 20–22.

Figure 28:
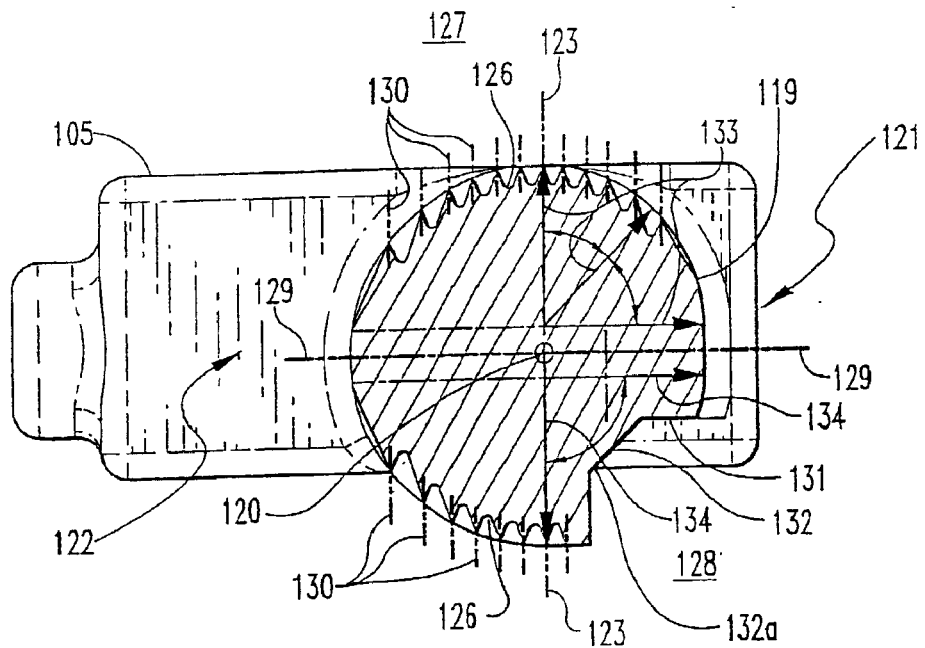
Figure 27:
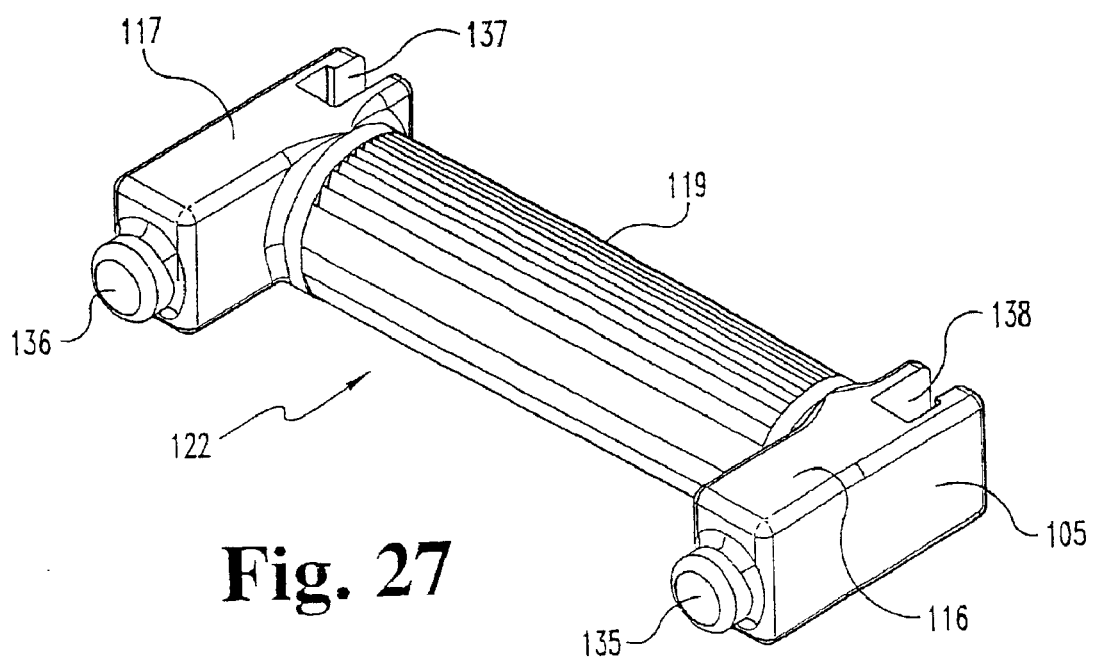

Details of bar 105 are shown in FIGS. 24–28. Bar 105 may be characterized as having a generally cylindrical body 119 with a longitudinal axis 120, a front face 121, a back face 122, and a frontal plane 123 (FIG. 28). Frontal plane 123 is important to convey the preferred placement of serrated portions 124 and 125. Referring to FIG. 28, each of these serrated portions is formed by cutting or molding grooves 126 in the top 127 or bottom 128 of cylindrical body 119. But notably, these grooves are preferably placed on top 127 or bottom 128 in planes 130 that are parallel with frontal plane 123 (or perpendicular to median plane 129). instead of placing the grooves in planes that share longitudinal axis 120. Wear on the web is generally reduced when grooves 126 are placed parallel with frontal plane 123. The front face 121 of cylindrical body 119 also preferably includes a longitudinal notch 131. Longitudinal notch 131 is placed in front face 121 so as to butt against web stop 109 on plate 104, and preferably includes bevel 132 to assist bar 105 in seating against web 141 and web stop 109. In this most preferred embodiment, web 141 is held between point 132a on bevel 132 and the top edge of web stop 109 on plate 104. Still further, front face 121 is preferably slightly thinner in cross-section than back face 122. For example, shortened radii 133 and 134 are preferably continued around front face 121 until they are parallel with median plane 129 to give central body 119 a generally elliptical cross-section. The longitudinal axis 120 is contained in frontal plane 123, which contains the max uppermost point on the top 127 and the maximum lowermost point on the bottom 128. As viewed in FIG. 28, all radii defining the back face 122 intersect longitudinal axis 120, and are greater than or equal to all radii defining front face 121.

Bar 105 also includes ears 116 & 117, which are mounted near each end of cylindrical body 119. As shown, these projections are preferably rectangular in shape, and extend away from the longitudinal axis of bar 105, from back face 122. Nonetheless, it is also contemplated that ears 116 & 117 may have other shapes and laterally extend from other sides of cylindrical body 119, such as from front face 121. Ears 116 & 117 provide torsional rigidity to bar 105 such that bar 105 will neither turn nor deform as force is applied to end 150 of web 141. Ears 116 & 117 preferably include tabs 135 & 136, as well as slots 137 & 138. Tabs 135 & 136 are sized to accept an end of springs 106 & 107, and slots 137 & 138 are sized to accept interlocking tabs 139 & 140 on button 108 (FIG. 23).

Housing 103 is generally concave in shape, the bottom/opening of which is shown in FIG. 23. Housing 103 contains two channels 111 & 112, which are largely defined by walls 118a & 118b and ear guides 142, which are included along the inside of housing 103. A backstop 143 is then preferably included inside housing 103 between the ends 114 & 115 of channels 111 & 112. Backstop 143 is preferably-supported by walls 149a–e. Beyond the foregoing structures, housing 103 preferably also includes access opening 144, which exposes the top of bar 105 and button opening 145 to provide access to front face 121 of bar 105.

With housing 103 formed in this fashion, web adjuster 101 is initially assembled by placing button 108 inside button opening 145. Bar 105 then rests inside housing 105 with ears 116 & 117 sliding in channels 111 & 112, between ear guides 142 (one ear guide each side of bar 105). As shown, bar 105 is oriented in these channels such that a on tabs 135 & 136 face channel ends 114 & 115, such that the longitudinal notch 131 faces plate 104 (discussed below), and such that slots 137 & 138 engage interlocking tabs 139 & 140 on button 108. Helical springs 106 & 107 are then inserted inside channels 111 & 112 between channel ends 114 & 115 and tabs 135 & 136.

The assembly of web adjuster 101 may then be completed by wrapping web 141 around bar 105 as shown in FIG. 22 and by covering the bottom of housing 103 with plate 104. Plate 104 is preferably made of metal and shaped to fit inside the edges 113 of the walls 118a & b of housing 103. Plate 104 has a web stop 109 (FIGS. 22 & 23), which mates against web 141 and longitudinal notch 131 on bar 105. Housing guide 110 then helps to insure that plate 104 remains in this position by receiving guide tabs 148 on walls 149b–d. Web adjuster 101 is then operated by pressing button 108, which releases the grip of bar 105 on web 141. With the grip released, end 150 of web 141 can be extended by pulling end 150 away from adjuster 101. End 151 can be extended whether button 108 is pushed or not by pulling end 151 away from adjuster 101.

Figure 1A:
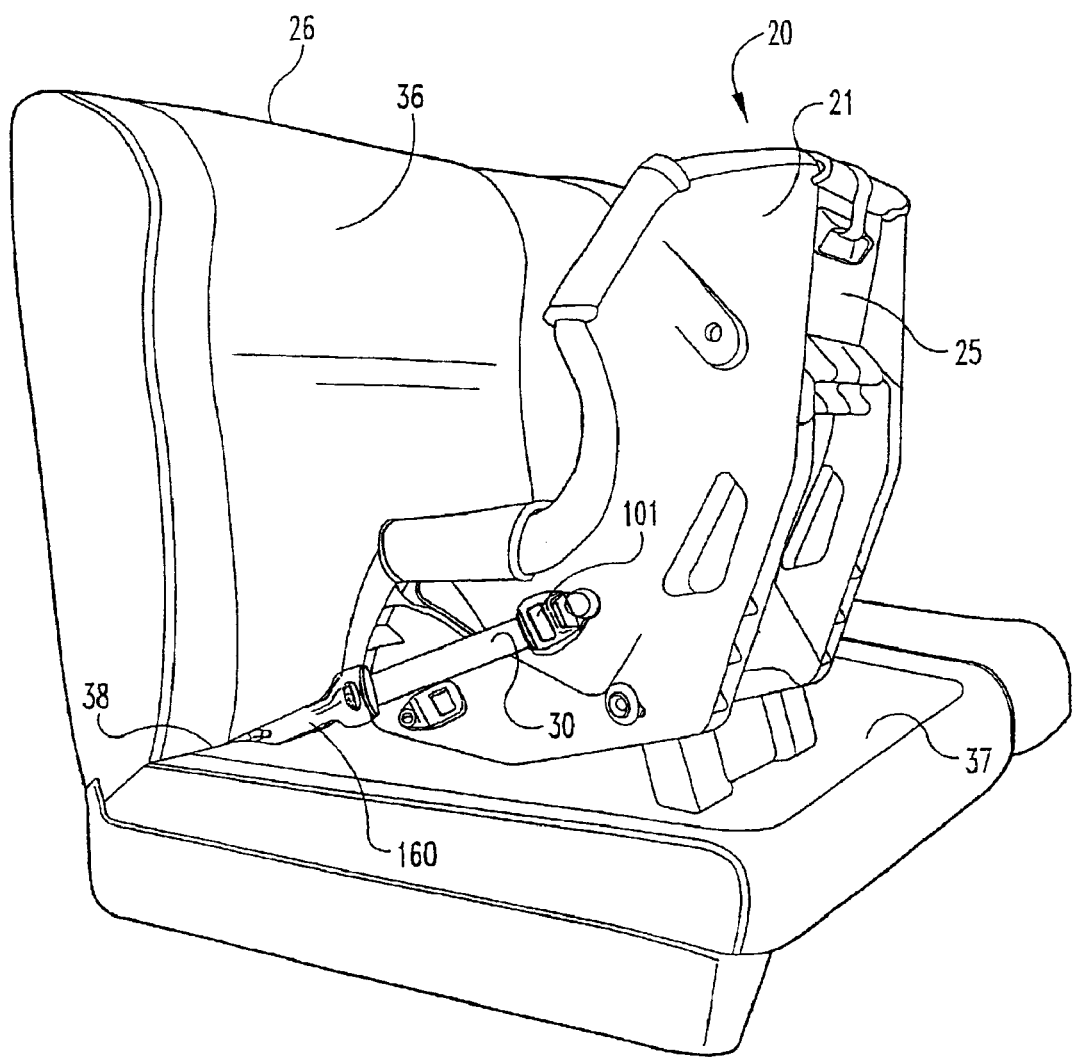
FIG. 1A is a perspective view of a passenger seat and a rearwardly facing child seat incorporating another embodiment of the present invention.
Figure 29:
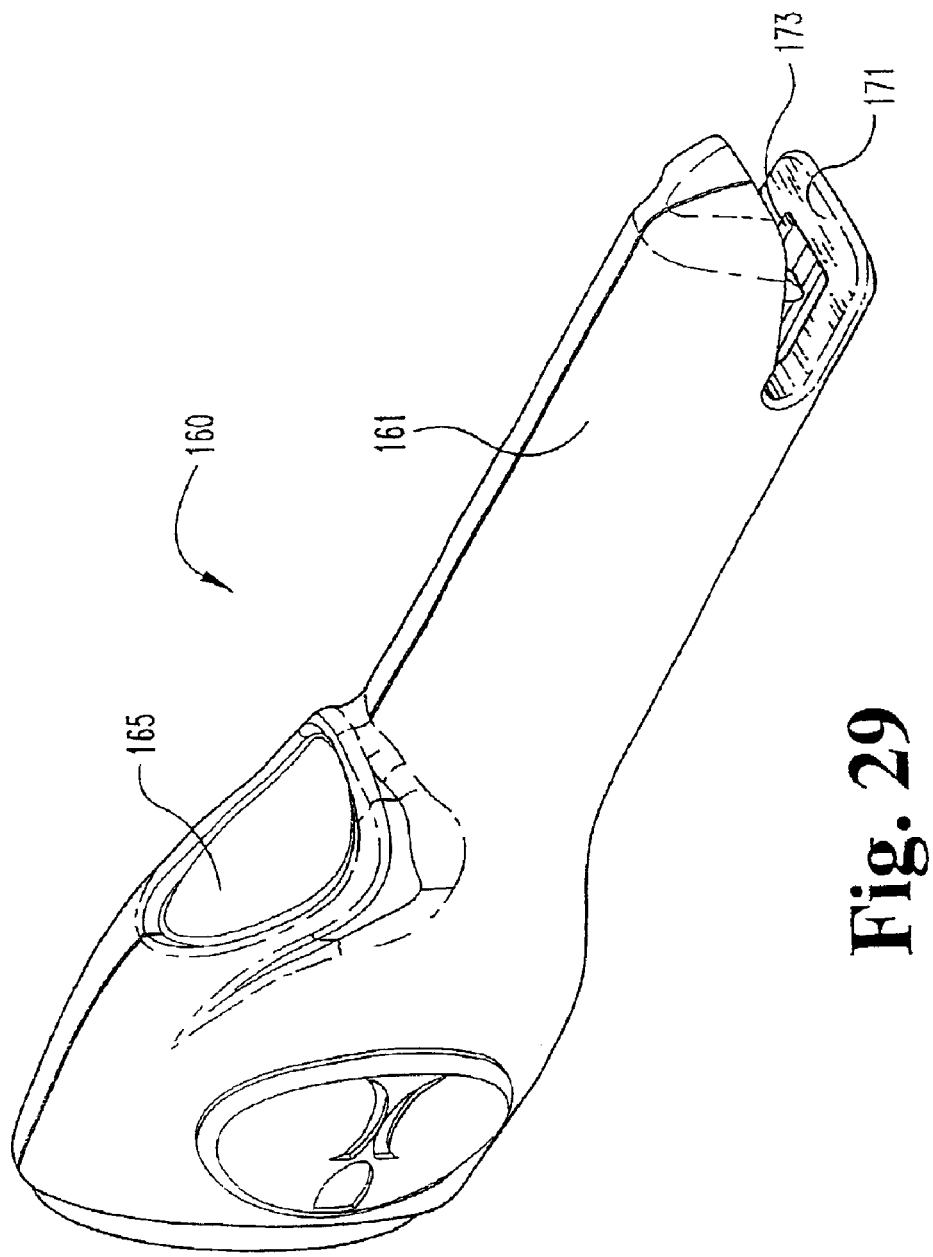
Figure 31:
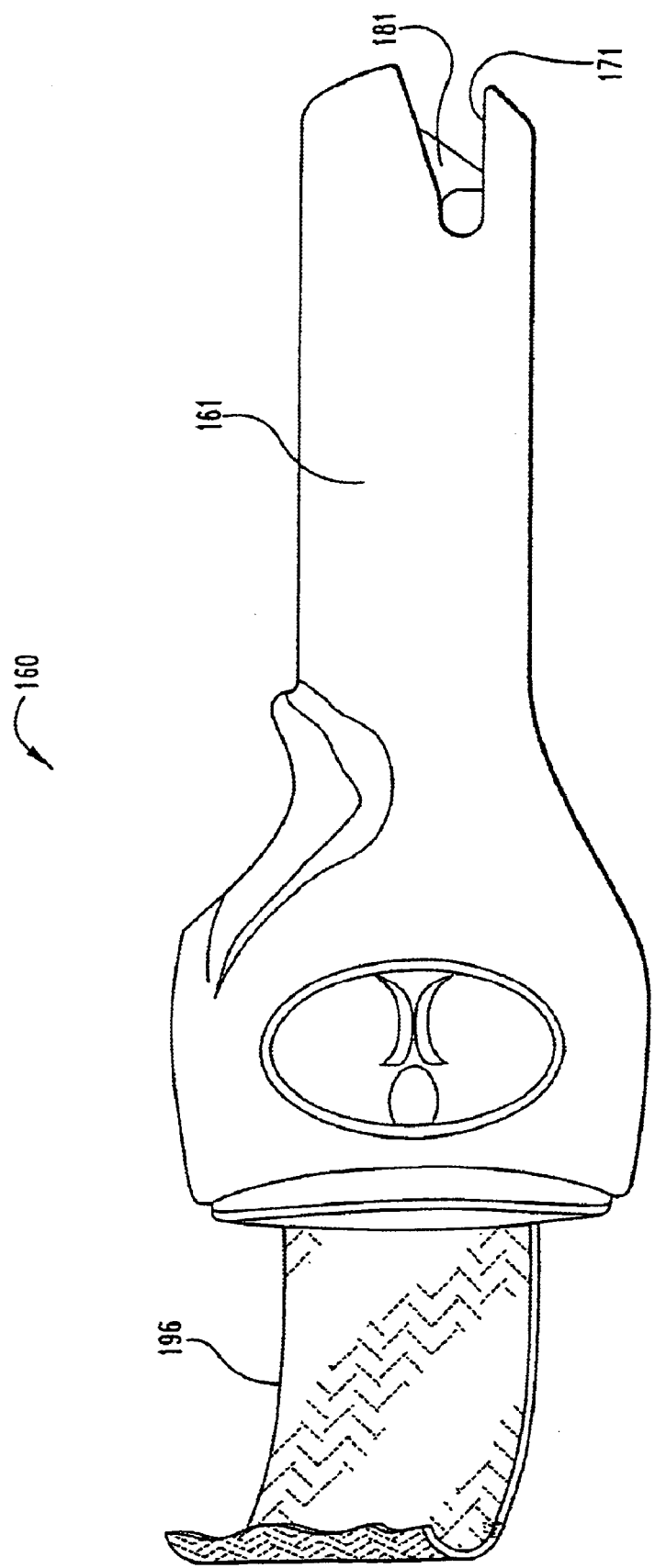
Figure 33:
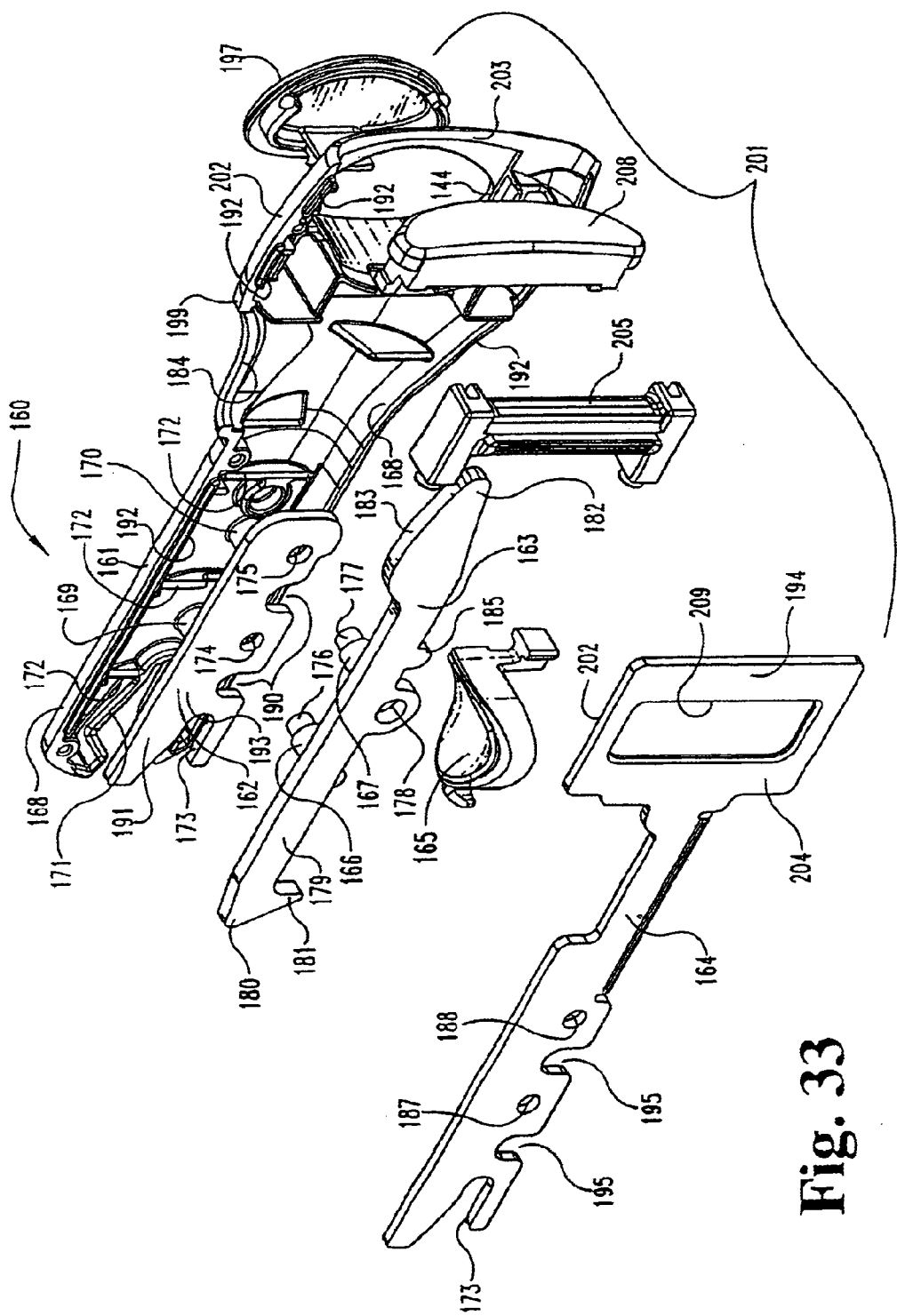
FIG. 33 is an exploded view of a connector according to one embodiment of the present invention.

Referring to FIG. 1A, in yet another alternative embodiment of the present invention, connector 160 shown in FIG. 29 may be substituted for rotary coupling 27. Top, side, and front views of this device are respectively shown in FIGS. 31–33. Referring now more particularly to FIG. 33, there is shown an exploded view of part of connector 160. Connector 160 includes housing 161, a plate 162, a lever 163, a plate 164, button 165, a biasing member or spring 186 (FIGS. 34 & 35) and pins 166 & 167.

Housing 161 is preferably injection molded from plastic into a generally concave shape that is largely defined on each side by walls 168. Housing 161 has plugs 169 & 170 and guides 192, which mate with complementary structures on the other half of housing 161, which has been omitted from FIG. 33 for clarity. Both halves of housing 161 have retaining walls 172 to hold plates 162 or 164 inside housing 161, against the top of plugs 169 & 170. Finally, housing 161 has a notch 171, which is sized to allow a fixedly mounted rigid member (not shown) to be placed inside the mouth 173 of plates 162 & 163.

The plate 162 is preferably made of metal and is sized to fit inside the walls 168 and beneath retaining walls 172 of housing 161. As shown, first plate 162 is also preferably formed at 190 to fit around plugs 169 & 170. The intermediate portion 193 of first plate 162 has two holes 174 & 175, which upon assembly, receive the tapered ends 176 & 177 of preferably metal pins 166 & 167. The distal end 191 of first plate 162 has a mouth 173 that is sized to receive a fixedly mountable rigid member (not shown). But in this regard, mouth 173 is preferably formed wider toward its distal end than its proximal end to allow the user to more easily place a fixedly mounted rigid member into the bottom of mouth 173.

Lever 163 is preferably made of metal and is sized to move inside the housing of connector 160, between plates 162 & 164. Lever 163 contains a hole 178 to pivot on pin 167. In contrast, pin 166 only supports the body 179 of lever 163 when connector 160 is left in the normally closed position. The distal end 180 of lever 163 has a downward projecting finger or tooth 181. Tooth 181 is preferably of a length to cover the distal opening of mouth 173 when connector 160 is resting in a normally closed position. The proximal end 182 of lever 163 has a button engagement surface 183 to ride against the bottom of button 165, button 165 being located in opening 184 of housing 161, directly above button engagement surface 183. Finally, lever 163 also has a projection 185, which upon assembly is sized to accept the end of spring 186 (FIGS. 34 and 35) to hold spring 186 in position against lever 163.

Plate 164 is also preferably made of metal and resides next to lever 163. Complementary to the profile of plate 162, plate 164 also contains holes 187 & 188 that are sized to receive the opposite tapered ends (omitted for clarity) of pin 166 and 167, and a mouth 173 that is sized to receive a fixedly mountable rigid member. Plate 164 is sized to fit inside housing 161, and again similar to plate 162 is also formed at 195 to fit around the plugs that attach to 169 & 170. The proximal end 194 of plate 164 is discussed below.

Figure 34:
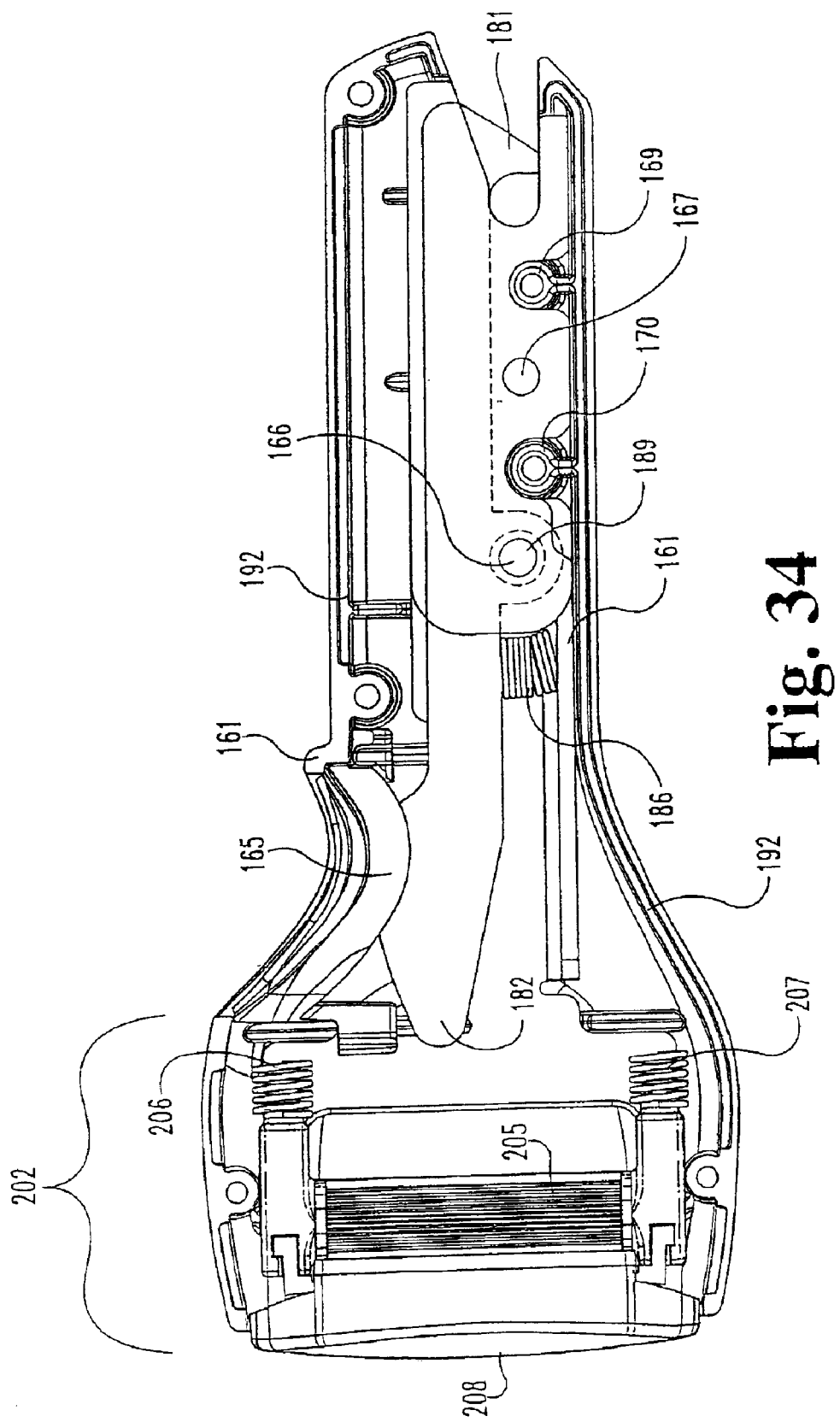
FIG. 34 is a side cross-sectional view of a connector in a closed position according to one embodiment of the present invention.
Figure 35:
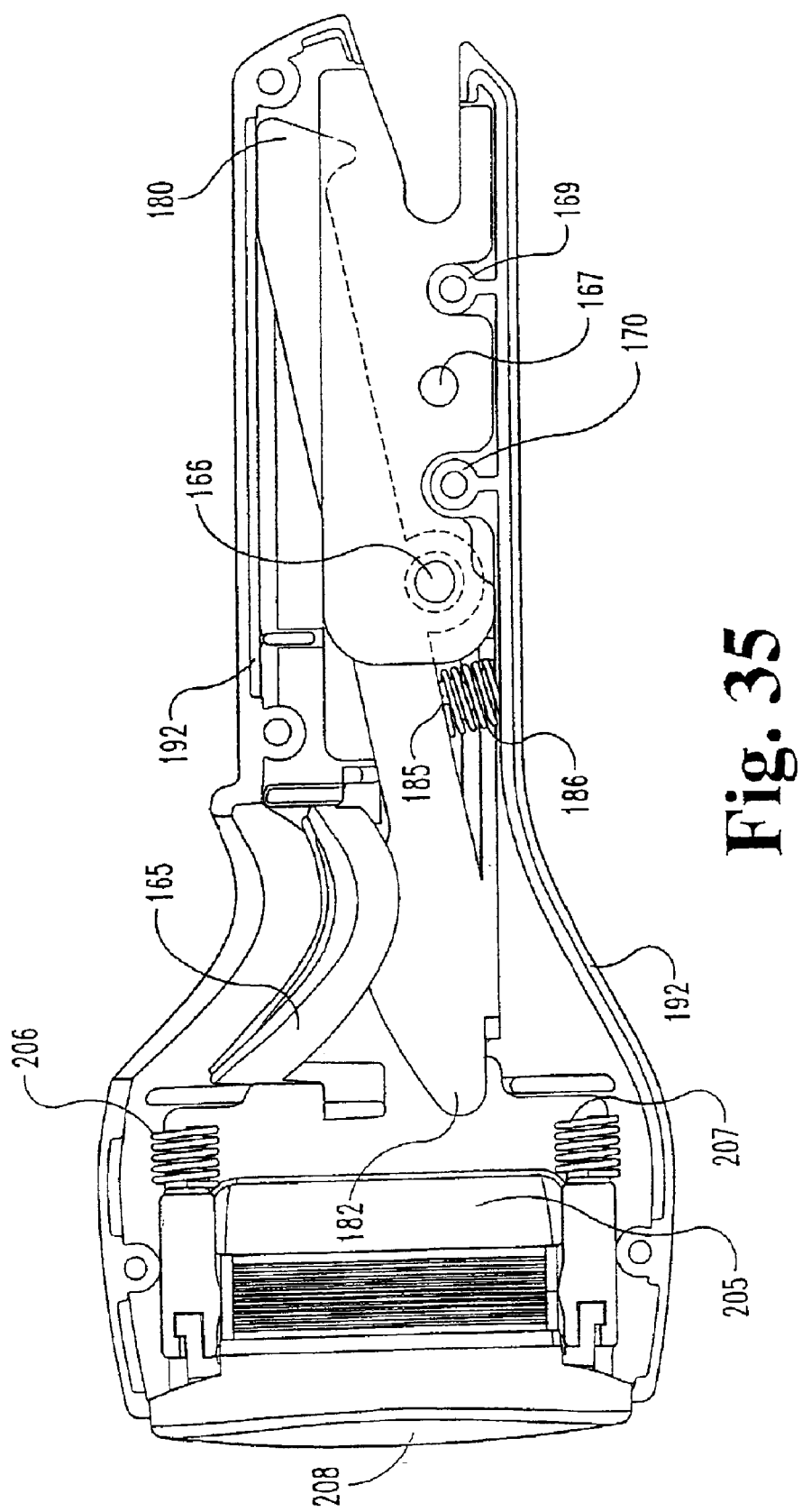
FIG. 35 is a side cross-sectional view of a connector in an open position according to one embodiment of the present invention.

Assembled in this fashion, connector 160 has a normally closed position shown in FIG. 34 and an open position shown in FIG. 35. In the closed position, spring 186 pushes against housing 161 and lever 163 at projection 185 at a location that is proximal to pivot point 189. Thusly extended, spring 186 urges button 165 up against housing 161 and simultaneously holds finger 181 on lever 163 in mouth 172 between plates 162 & 164 to cover mouth 172 and close connector 160. Connector 160 is opened by pushing downward on button 165 and compressing spring 186, which in turn, lifts distal end 180 and pulls finger 181 out of mouth 172. With lever 163 relocated in this manner, mouth 172 is ready to receive a fixedly mountable rigid member.

Like previously discussed rotary coupling 27, the distal end of web 196 (FIG. 31) can be attached to the proximal end of connector 160 in any conventional manner, such as with pins, rivets, stitching, or a conventional web adjuster. But in this regard, it is also contemplated that both rotary coupling 27 and connector 160 may incorporate web adjuster 101 as an integral part of the connector. Similarly, coupling 360 and 460 below could incorporate adjuster 101 as an integral part of the connector. Also, couplings 27 and connector 160, 360, 460 could incorporate as an integral part, or using a web connection, any of the web adjusters 501, 601, 701, disclosed in commonly owned U.S. patent application Ser. No. 10/206,660 of Dingman, et al. filed 26 Jul. 2002, incorporated herein by reference, and, conversely, web adjusters 101, 501, 601, and 701 could be used with any sort of connector, whether integral thereto, or used with an intervening web, examples of both of which are shown in FIGS. 58 and 59 the Dingman application No. 10/206,660. The method to attach web adjuster 101 to either coupling 27 or connector 160, 360, 460 is well within the average skill of this art. Be that as it may, FIGS. 29–36 depict an illustrative integration and the following description is provided for the convenience of the reader.

Figure 36:
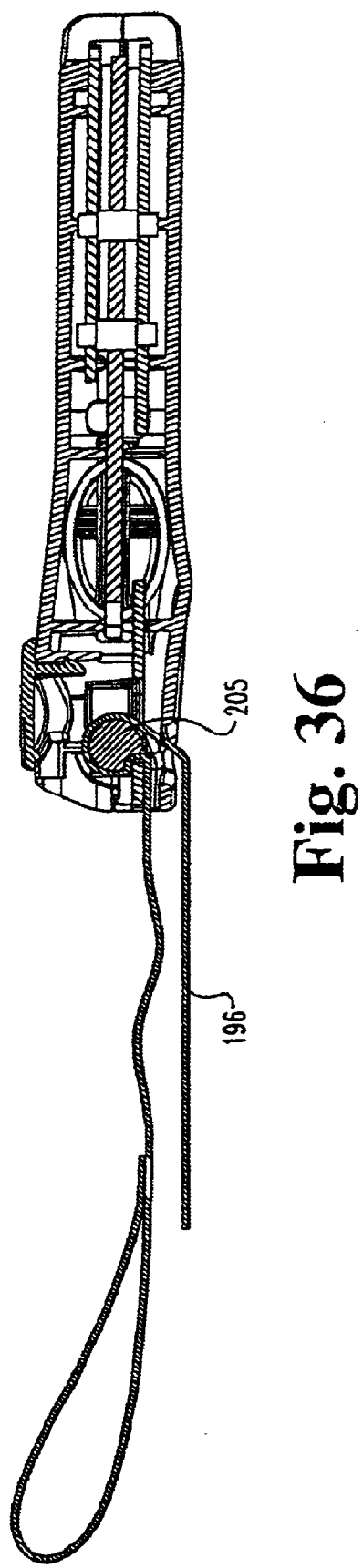
FIG. 36 is a top cross-sectional view of a connector according to one embodiment of the present invention.
Figure 37:
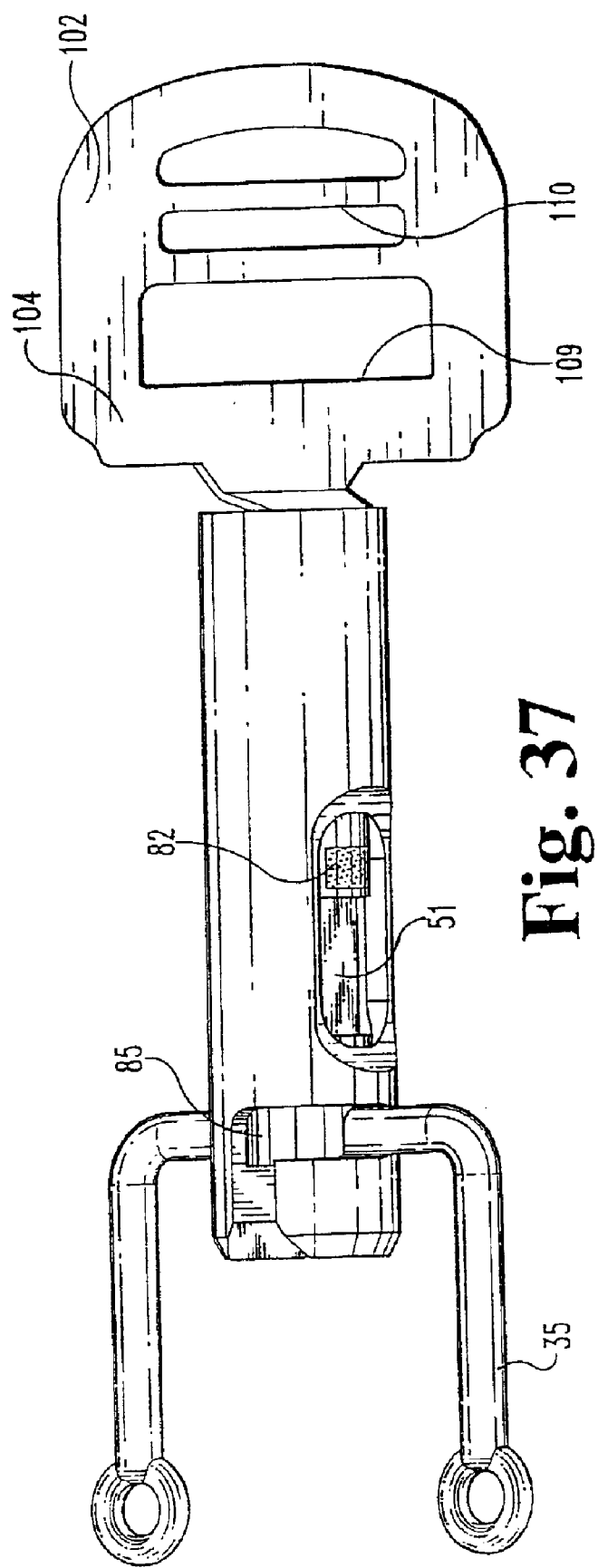
FIG. 37 is a top view of a rotary coupling incorporating a web adjuster according to one embodiment of the present invention.

Illustratively, referring again to FIGS. 33–35, there is shown an exploded view of web adjuster 201 that is integrated or attached to connector 160. Like web adjuster 101, web adjuster 201 includes a bar 205, two springs 206 & 207 (FIG. 35), a button 208, a frame 202; which may be conceptually subdivided into housing 203 and plate 204; and a web 196 (FIG. 36). Bar 205, and springs 206 & 207 are preferably identical to the previously described bar 105 and springs 106 & 107, and web 196 is wound around bar 205 similarly as web 141 is wound around bar 105. Housing 203 is largely identical to previously described housing 103 except that it is now an integral part or a continuation of housing 161 and includes a cover 197 to cover access opening 144. Finally, plate 204 is largely similar to previously described plate 104 with a web stop 209 to grip web 196 just as web stop 109 gripped web 141. But by also being a continuous part of plate 164, plate 204/plate 164 provides a mechanical connection between a fixedly mountable rigid member (not shown) and web 196. Connector 160 or the rotary coupling of FIG. 37 may be integrally connected to a web adjuster such as web adjuster 101.

Figure 38:
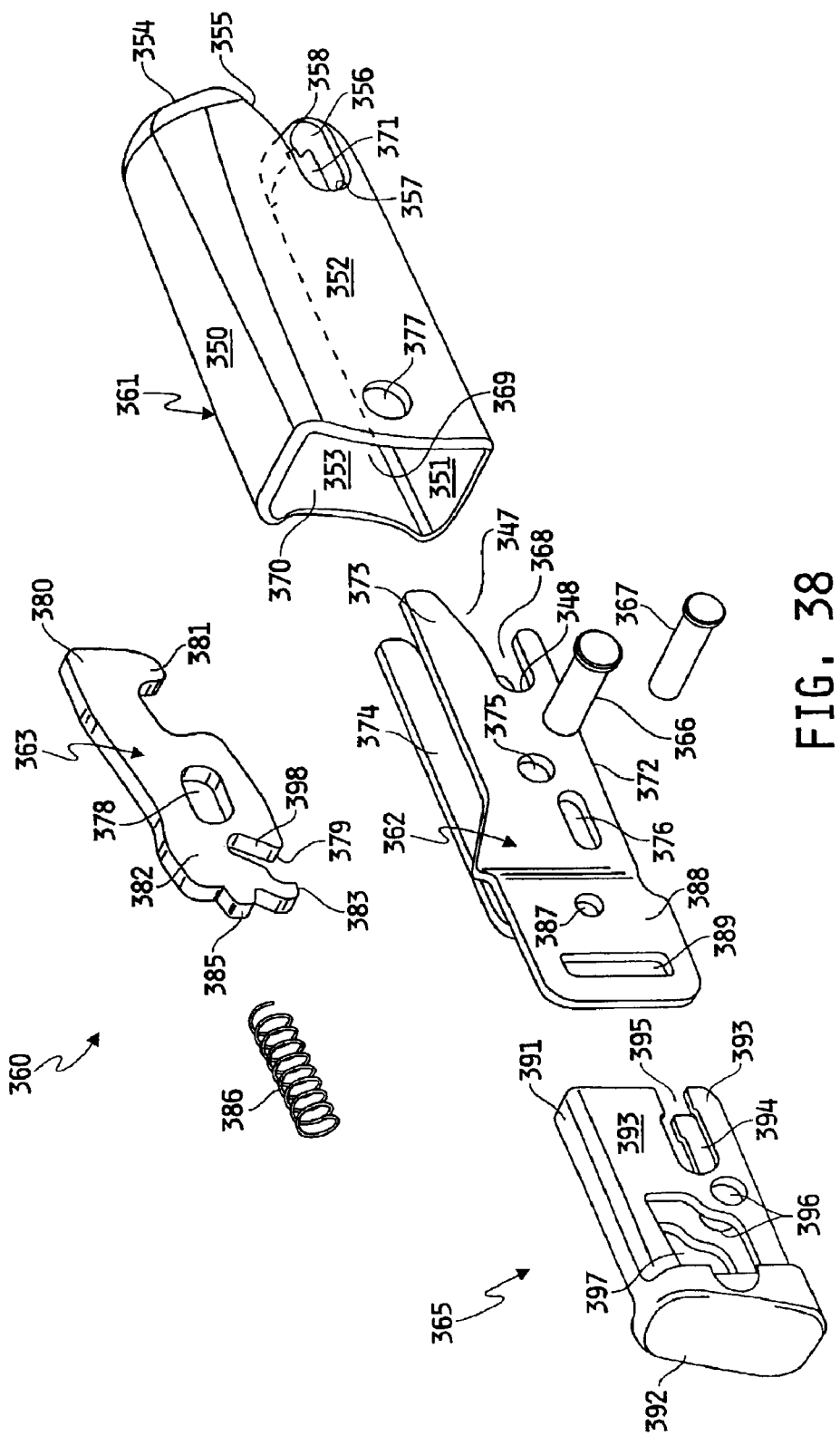
FIG. 38 is an exploded view of a connector according to one embodiment of the present invention.

Referring to FIG. 38, another illustrative embodiment is depicted. More particularly, an exploded view of connector 360 is provided. Connector 360 comprises a housing 361, a frame 362, a lever 363, a button or manipulation assembly 365, a mounting member 366, which illustratively is a pin 366, a stop member or pin 367, and a biasing member 386, which, in the illustrative embodiment is a spring, for example a helical or a coiled compression spring.

Illustratively, as best seen in FIG. 38, housing 361 is a generally unitary piece of injection molded plastic having a generally rectangular shape and including a top surface 350, a pair of spaced apart and generally parallel side surfaces 352 and 353, a bottom surface 351, which is generally parallel to and spaced apart from top surface 350, and an end surface 354. Side surfaces 352 and 353 are generally perpendicular to top surface 350, bottom surface 351 and end surface 354, which is generally perpendicular to top surface 350. Surfaces 350, 351, 352, 353 354 define a cavity 369 having an opening 370 through the end of the housing 361 opposite from end surface 354. The other end of housing 361 has an aperture or notch 371 having a mouth 358 and a seat 357 configured to receive an anchor member such as member 364 in FIG. 41 or other suitable anchor member, coupling or connector. Notch 371 opens through end surface 354 and side surfaces 352, 353 and conceptually divides end surface 354 into an upper portion 355, a lower portion 356 and the seat portion 357. Cavity 369 is generally rectangular in cross section, generally extends from the opening 370 to the notch 371, and generally is sized to snugly receive the other components of the connector 360. Extending inwardly toward the cavity 369 from the notch 371 and generally perpendicular thereto is a generally continuous and inwardly oriented ridge (not shown) framing the notch. The upper portion 355 includes inside the cavity 369 a pair guide walls (not shown), which are generally perpendicular to top surface 350, which are generally spaced apart from each other and from the side surfaces 352, 353, and which extend longitudinally away from the end surface 354 toward the seat portion 357. The ridge and the guide walls are configured to guide and nestle the frame 362 and lever 363 assemblies as will be explained below. Housing 361 also has a coupling aperture 377 formed to receive any conventional connector (not shown) to secure the housing to the other components when assembled. It will be appreciated that the housing 361 need not be of monolithic construction, and that it may be made of other suitable non-metallic, metallic, or composite materials, or a combination thereof if desired. For example, all or a portion of the housing 361 may be made of graphite, titanium, zinc, aluminum, kevlar, and the like. In addition, the housing 361 may be manufactured using any process compatible with the material being used, such as, for example, injection molding, die casting, stamping, or the like.

Figure 41:
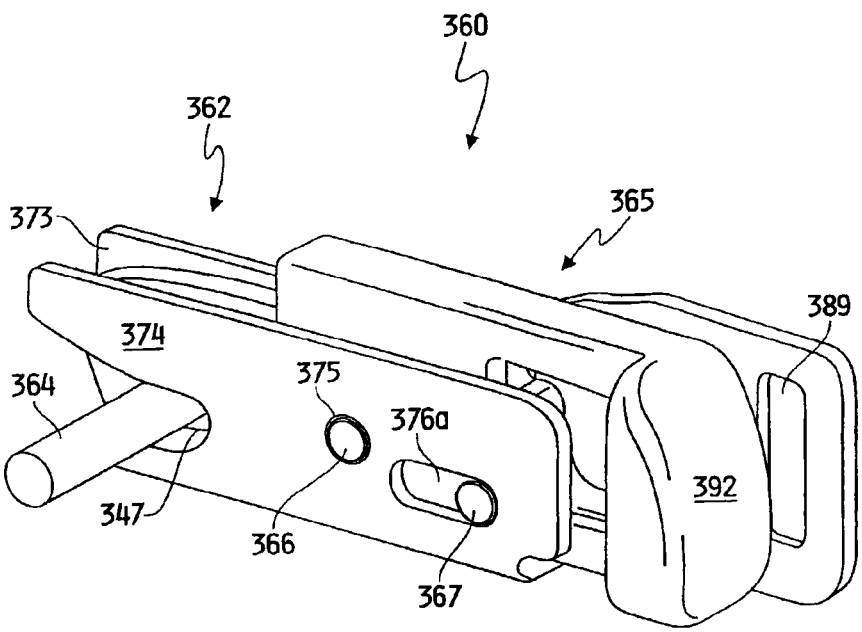
FIG. 41 is a partial side sectional view of a connector in the closed position according to one embodiment of the present invention.
Figure 42:
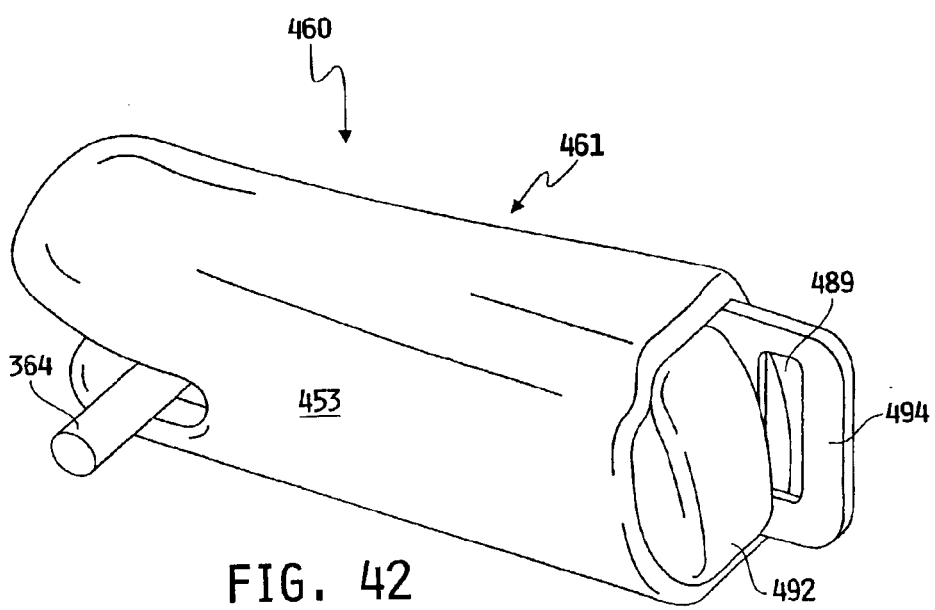
FIG. 42 is a perspective view of another illustrative connector in the closed position according to one embodiment of the present invention.

Still referring to FIG. 38, frame 362 is a generally monolithic structure having a substantially U-shaped transverse cross-section and is sized to fit snugly within housing 361. Frame 362 has a bottom surface 372, and a pair of spaced apart side surfaces or plates 373 and 374, which project upwardly from the bottom surface 372. Referring to FIGS. 38 and 41, the sides 373 and 374 each have a mounting aperture 375 configured to receive mounting member 366, and a rectilinear translating aperture or channel 376 configured to receive stop member 367, which, illustratively is a pin, therethrough. Side 373 includes an appendage 388, which protrudes outside of housing 361 after assembly (FIG. 42). Appendage 388 has an anchor aperture 389 formed to receive a web belt (not shown) or other conventional connector or coupling device, and a coupling aperture 387 sized to receive any conventional connector (not shown), such as for example, a pin, a rivet, a screw, a tack, or other suitable connector inserted through the aligned aperture 377 in housing 361. The frame may be made of any suitable metallic, non-metallic, or composite material, or combination thereof, and may be of non-monolithic, unitary construction. For example, frame sides 373 and 374 could be stand-alone plates coupled together using any standard coupling, including welding, or the use of rivets, screws, bolts, pins and the like.

Sides 373, 374 are spaced apart such that they fit within the housing 361 and such that they mate with the spaced-apart guide walls (not shown) inside the upper portion 355 of notch end 354. The sides are also spaced so as to receive and sandwich therebetween the assembled manipulation assembly 365 and the lever 363, which is received within the manipulation assembly 365, and their respective sub-components (FIGS. 38 and 41) as will be explained. Thus, the downwardly extending sides of the button assembly nest between and oppose the upwardly extending sides of the frame, with the lever nested between all sides 373, 374, 393, 394. The sides 373, 374 also define a notch 347 having a mouth 368 and a seat 348, and which are also sized to receive an anchor member, for example, the rigid member 364 (FIG. 41), or any other anchor member, such as, for example, a loop in a web.

Lever 363 is illustratively monolithic and made of metal and is sized to move relative to and inside the frame 362 between sides 373 & 374. Lever 363 has an elongated mounting aperture 378 configured to receive and move about mounting member 366. The distal end 380 of lever 363 has a downward projecting finger 381. Finger 381 illustratively is sized to cover the distal opening of mouth 368 when connector 360 is resting in a normally closed position. The proximal end 382 of lever 363 has a channel 398, an engagement portion 383, and a spring mounting portion 385. Channel 398 includes a camming portion 379. The lever 363 may also be made of any suitable non-metallic or composite material, or any combination of metallic, non-metallic and composite materials, and may be die cast or made by other processes suitable for the material in use. The lever may also be non-monolithic.

Illustratively, the monolithic manipulation or button assembly 365 has a substantially inverse U-shaped transverse cross section and is injection molded from, for example, plastic into a generally rectangular shape having a top surface 391, a manipulation portion 392, and spaced apart side surfaces 393 and 394. The side surfaces 393, 394 project downwardly from top surface 391 toward and generally adjacent to the bottom portion 372 of frame 362. Sides 393, 394 are spaced to fit between sides 373, 374, and to receive and sandwich therebetween lever 363. At the end opposite the manipulation surface 392, the side surfaces 393, 394 form an elongated translating aperture or channel 395, configured to receive mounting member 366 therein as a force is applied to depress the manipulation portion 392 and to translate the button assembly 365 forwardly toward said mounting member 366. Referring to FIG. 38, the sides 393, 394 each have aligned stop apertures 396 adapted to receive stop member 367. The button assembly 365 also has an opening or aperture 397 adapted to receive and longitudinally house spring 386, which attaches to a mounting appendage or tab 384 inside the aperture 397. It will be appreciated that other suitable metallic, non-metallic or composite materials or combinations thereof, and any method of manufacture appropriate to such material may be used.

Figure 39:
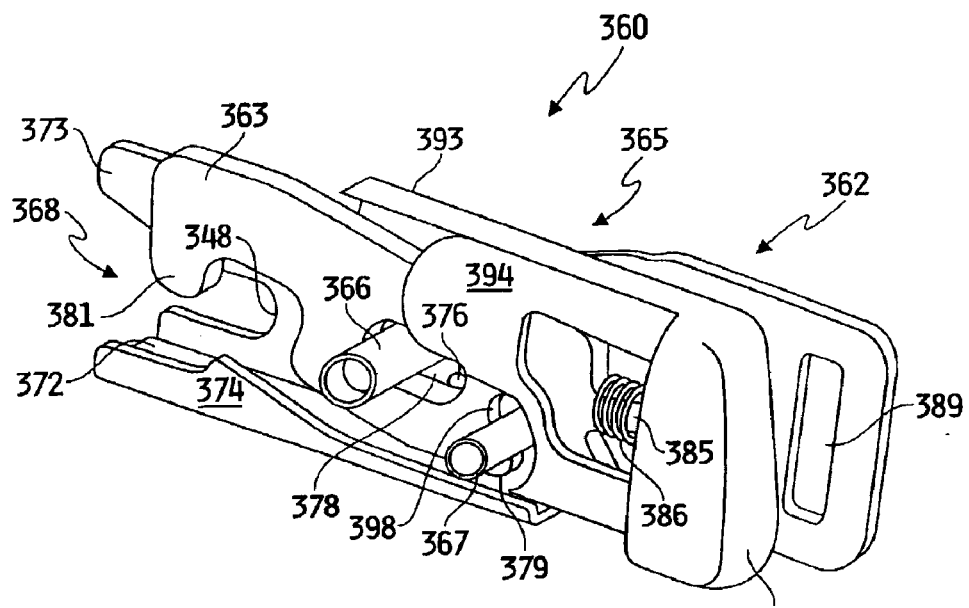
FIG. 39 is a partial side sectional view of a connector in an open position according to one embodiment of the present invention.
Figure 40:
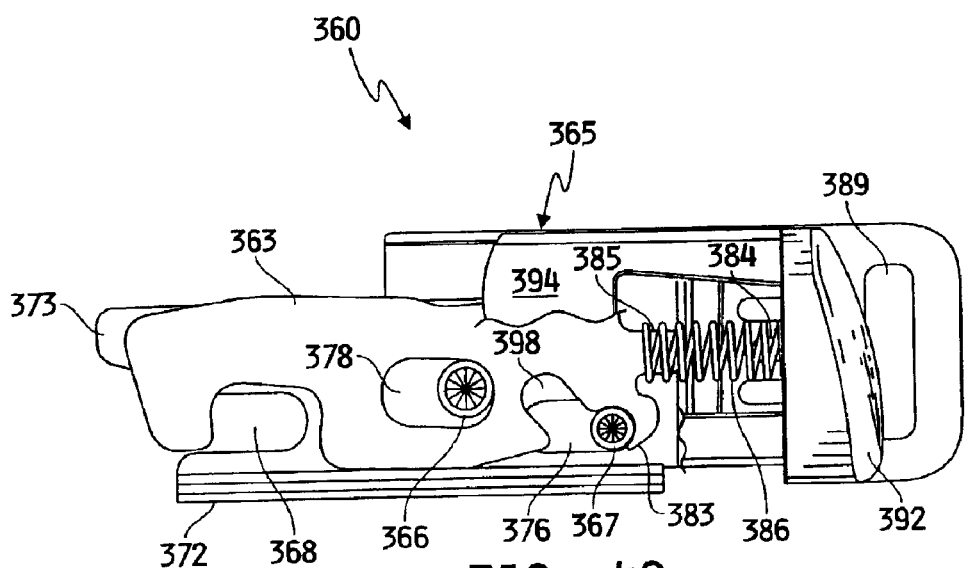
FIG. 40 is a partial side sectional view of a connector in an open position according to one embodiment of the present invention.

As best seen in FIGS. 39–41, lever 363 bas a normally closed position and an open position. During the normally closed position, the lever 363 is in a generally horizontal position such that the finger 381 is in the down position thereby closing off the notch 371 and the mouth 358, 368. In this closed position, the mounting member or pin 366 is at the end of mounting aperture 378 farthest away from notch 371 and at the end of translating aperture 395 closet to notch 371. Thus the apertures 378, 395 generally close around the mounting member. Also, engagement portion 383 normally abuts against the top of the stop member 367 to positively lock the lever 363 to limit its movement out of the closed position when the lever 363 is in the normally closed position. Also in this closed position, spring mounting portion 385 is adapted to receive spring 386, which tends to urge the button assembly away from the notch 371 end, thereby keeping the stop member 367 in contact with the stop member engagement portion 383.

Referring to FIGS. 39 and 40, when the manipulation surface 365 is pressed inwardly toward the notch 371, the stop member 367 moves rectilinearly along translating aperture 376 thereby disengaging from the engagement portion 383 and impinging upon the camming portion 379, thereby moving the lever 363 upwardly out of its horizontal and normally closed position. As the lever 363 is cammed upwardly, it moves about pin 366 in channel 378 until, near simultaneously, pin 366 reaches the end of channel 378 closest to notch 371 and the substantial end of channel 395 furthest away from notch 371, while stop member 367 reaches the end of translating aperture 376, thereby unlocking and moving finger 381 to unblock notch 371 and mouth 358, 368. When pressure is released, the spring 386 urges the manipulation assembly and the stop member carried thereon back through the translating aperture 376 and toward the anchor aperture 389 and back into abutment with the engagement portion 383 to return lever 363 back to the normally closed position. In addition to a spring, for example a helical spring, the biasing member 386 may be any other biasing member suitable to urge the lever into the closed position. For example, a hydraulic unit may be used. It will be appreciated that rather than moving the stop member 367 from under the engagement portion 383 by translating the stop member, the lever could be translated rectilinearly to move the engagement portion 383 off of the stop member 367 thereby freeing lever 363 to move and unblock the notch and mouth.

Referring to FIGS. 42–44, this embodiment of the connector 460 incorporates the profile and construction of the embodiment depicted in FIGS. 38–41, while operating substantially in accordance with the device depicted in FIG. 33. Thus, connector 460 has the reduced profile of connector 360 and the operating characteristics of connector 160. One skilled in the art will therefore understand how connector 460 is constructed and operated. The following explanation is provided, however, for illustration.

Referring to FIG. 43, another illustrative embodiment is depicted. More particularly, an exploded view of connector 460 is provided. Connector 460 comprises a housing 361, a frame 462, a lever 463, a button or manipulation assembly 465, a mounting member 466, which illustratively is a pin 466, a mounting pin 467, and a biasing member 486, which, in the illustrative embodiment is a spring, for example a helical or a coiled compression spring.

Illustratively, as described above and as best seen in FIGS. 38 and 43, housing 361 is substantially identical to housing 361 associated with adjuster 360 in all respects. Consequently, the same reference numerals are used and the same description applies. In addition, it will again be appreciated that the housing 361 need not be of monolithic construction, and that it may be made of other suitable nonmetallic, metallic, or composite materials, or a combination thereof if desired. For example, all or a portion of the housing 361 may be made of graphite, titanium, zinc, aluminum, kevlar, and the like. In addition, the housing 361 may be manufactured using any process compatible with the material being used, such as, for example, injection molding, die casting, stamping, or the like.

Referring to FIG. 43, frame 462 is a generally monolithic structure having a substantially U-shaped transverse cross-section and is sized to fit snugly within housing 361. Frame 462 has a bottom surface 472, and a pair of spaced apart side surfaces or plates 473 and 474, which project upwardly from the bottom surface 472. The sides 473 and 474 each have a mounting aperture 475 configured to receive mounting member 466. Side 473 includes an appendage 488, which protrudes outside of housing 361 after assembly (FIG. 42). Appendage 488 has an anchor aperture 489 formed to receive a web belt (not shown) or other conventional connector or coupling device, and a coupling aperture (not shown) sized to receive any conventional connector (not shown), such as for example, a pin, a rivet, a screw, a tack, or other suitable connector inserted through the aligned aperture 377 in housing 361. Appendage 488 further includes mounting aperture 487 configured to receive mounting pin 467 as will be explained. The frame 462 may be made of any suitable metallic, non-metallic, or composite material, or combination thereof, and may be of non-monolithic, unitary construction. For example, frame sides 473 and 474 could be stand-alone plates coupled together using any standard coupling, including welding, or the use of rivets, screws, bolts, pins and the like.

Sides 473, 474 are spaced apart such that they fit within the housing 361 and such that they mate with the spaced-apart guide walls (not shown) inside the upper portion 355 of notch end 354. The sides are also spaced so as to receive and sandwich therebetween the assembled manipulation assembly 465 and the lever 463, which is received within the manipulation assembly 465, and their respective sub-components (FIG. 43) as will be explained. Thus, the downwardly extending sides of the button assembly nest between and oppose the upwardly extending sides of the frame, with the lever nested between all sides 473, 474, 493, 494. The sides 473, 474 also define a notch 347 having a mouth 368 and a seat 348, and which are also sized to receive an anchor member, for example, the rigid member 364 (FIG. 41), or any other anchor member, such as, for example, a loop in a web.

Lever 463 is illustratively monolithic and made of metal and is sized to move relative to and inside the frame 462 between sides 473 & 474. Lever 463 has an mounting aperture 478 configured to receive and move about mounting member 466. The distal end 480 of lever 463 has a downward projecting finger 481. Finger 481 illustratively is sized to cover the distal opening of mouth 358, 368 when connector 460 is resting in a normally closed position. The proximal end 482 of lever 463 has an engagement portion 479 and a spring mounting portion 485. The lever 463 may also be made of any suitable non-metallic or composite material, or any combination of metallic, non-metallic and composite materials, and may be die cast or made by other processes suitable for the material in use. The lever may also be non-monolithic.

Illustratively, the monolithic manipulation or button assembly 465 is injection molded from, for example, plastic into a generally ovate to oblong shape having a top manipulation portion 492 and an engagement portion 490, and including a mounting aperture 496 configured to receive the mounting pin 467 to movably mount said manipulation assembly 465 to frame 462. It will be appreciated that other suitable metallic, non-metallic or composite materials or combinations thereof, and any method of manufacture appropriate to such material may be used.

Lever 463 has a normally closed position (FIG. 44) and an open position. During the normally closed position, the lever 463 is in a generally horizontal position such that the finger 481 is in the down position thereby closing off the notch 371 and the mouth 358, 368. In this closed position, the spring 486 acts between the frame 462 and the lever 463 to urge the lever into the closed position and the engagement portion 479 and camming portion 490 into engagement. Lever 463 may be moved out of the closed position either by applying pressure to the distal end of the lever 463, for example, by applying upward pressure to the finger 481, or by applying pressure to the manipulation portion 492 to move the manipulation assembly relative to the frame to move the lever as the camming portion translates the pressure downwardly on the engagement portion 479. Upon releasing the pressure from the manipulation portion 492, the spring 486 will urge the ever 463 upwardly into the normal closed position.

It is within the understanding of those skilled in this art, that each of the described illustrative embodiments may be used, not only to mount a child seat to a vehicle, such as, for example, a car, a van, or a bus, wherein any such vehicle has at least one rigid member mounted in the bite of the seat between the seat's seat and back portion, but also may be adapted to secure one or more straps to any anchor member, such as, for example an anchor member mounted to the floor of a vehicle, in order, to restrain a pet, or some cargo. In addition, they may be used to secure a restraint harness to one or more anchor members.

While the invention has been illustrated and described in detail in the drawings and foregoing description, the same is to be considered as illustrative and not restrictive in character, it being understood that one skilled in the art will recognize, and that it is desired to protect, all aspects, changes and modifications that come within the spirit of the invention.

What is claimed is:

1. A coupling for attachment to an anchor member, the coupling comprising:

a frame having a proximal end and a distal end, the distal end of said frame including a mouth having a seat configured to receive the anchor member;

a lever movably mounted to said frame, said lever having a proximal end and a distal end, said distal end including a finger and said proximal end including an engagement portion; said distal end of said lever extending beyond the seat of the notch in said frame; wherein said lever has a normally closed position prior to attachment to the anchor member wherein said finger substantially covers the mouth and an open position wherein said finger is substantially removed from the mouth;

a stop member provided on said frame configured to normally engage said engagement portion to resist the movement of said lever from said normally closed position to said open position; and a biasing member acting between said frame and said lever; said biasing member normally urging said stop member and said engagement portion into engagement.

2. The coupling of claim 1, wherein said lever moves pivotally relative to said frame.

3. The coupling of claim 1, wherein said lever moves rectilinearly relative to said frame.

4. The coupling of claim 1, wherein said lever moves both pivotally and rectilinearly relative to said frame.

5. The coupling of claim 1, wherein said stop member moves rectilinearly relative to said frame.

6. The coupling of claim 1, further including a manipulation portion operatively connected to said lever and said stop member.

7. The coupling of claim 6, wherein applying a force to the manipulation portion moves the stop member and the engagement portion out of engagement.

8. The coupling of claim 6, wherein said manipulation portion moves said stop member rectilinearly relative to said frame.

9. The coupling of claim 8, wherein said proximal end of said lever further includes a camming portion, said stop member moving rectilinearly to abut said camming portion to pivot said lever to said open position when a force is applied to said manipulation portion.

10. The coupling of claim 1, wherein said frame includes two plates mounted on each side of said lever.

11. The coupling device of claim 10, wherein at least one of said plates includes a mouth configured to receive the anchor member.

12. The coupling device of claim 10, wherein said frame is a monolithic structure.

13. The coupling device of claim 1, further including a housing configured to receive and mount therein said frame and said lever.

14. The coupling device of claim 13, wherein said housing includes a notch having a mouth and a seat configured to receive the anchor member.

15. The coupling device of claim 13, wherein said housing is a monolithic structure.

16. The coupling of claim 1, wherein said frame includes an anchor aperture to receive a connector to operatively attach the coupling.

17. The coupling of claim 16, wherein said connector comprises a web.

18. The coupling of claim 16, wherein said connector comprises a web operatively attached to a web adjuster.

19. The coupling of claim 16, wherein the connector operatively attaches the coupling to a child seat.

20. A coupling for attachment to an anchor member, the coupling comprising:
a spring;
a monolithic frame having a substantially U-shaped transverse cross section including a bottom surface and a pair of side surfaces projecting upwardly away from said bottom surface, each side surface including a mounting aperture, an elongated translating aperture, and a notch having a mouth and a seat configured to receive the anchor member, one side further including a coupling aperture and an anchor aperture configured to receive a connector;
a lever having a proximal end and a distal end, said lever including a elongated mounting aperture, said proximal end having an engagement portion, a camming portion, and a mounting portion to mount one end of said spring; and said distal end having a finger;
a monolithic manipulation assembly having a substantially inverted U-shaped transverse cross-section including a manipulation portion having a mounting tab configured to mount the other end of said spring, said manipulation assembly further including a top surface and a pair of side surfaces projecting downwardly away from said top surface; the downwardly projecting side surfaces each including an elongated translating aperture configured to receive a mounting member therein, and a stop aperture to receive a stop member therethrough; and
a monolithic housing including a proximal end having an opening, and a distal end having a notch with a mouth and a seat configured to receive the anchor member, said housing further including a coupling aperture;
wherein said lever is movably received between said downwardly projecting side surfaces and movably mounted between said upwardly projecting side surfaces by said mounting member passing through said mounting apertures; said manipulation assembly movably mounted to said frame by said stop member passing through said translation apertures and said stop aperture.

21. The coupling of claim 20, wherein the spring is a coiled compression spring.

22. The coupling of claim 21, wherein said spring tends to urge the engagement portion and the stop member into abutment.

23. The coupling of claim 22, wherein said lever moves pivotally relative to said frame.

24. The coupling of claim 23, wherein said lever moves rectilinearly relative to said frame.

25. The coupling of claim 24, wherein said manipulation assembly moves rectilinearly relative to said frame.

26. A coupling for attachment to an anchor member, the coupling comprising:
a frame having a distal end defining a mouth configured to receive the anchor member;
a lever movably mounted to said frame and having an open position to allow the anchor member to be received within the mouth and a normally closed position prior to attachment to the anchor member to retain the anchor member within the mouth;
a stop member provided on said frame; and
a biasing member urging the stop member and the lever into engagement such that said stop member resists movement of said lever from said normally closed position to said open position.

27. The coupling of claim 26, wherein said lever pivots about a mounting member provided on said frame moving between said closed position and said open position.

28. The coupling of claim 26, wherein said frame further includes an anchor aperture which receives a connector.

29. The coupling of claim 28, wherein said connector comprises a length of web.

30. The coupling of claim 28, wherein said connector comprises a length of web operatively coupled to a web adjuster.

31. The coupling of claim 28, wherein said connector comprises a rigid member.

32. The coupling of claim 31, wherein said rigid member is a screw.

33. The coupling of claim 28, further including a manipulation member operatively connected to the proximal end of said lever.

34. The coupling of claim 33, wherein the manipulation member moves said lever from the closed position to the open position upon a force being applied to said manipulation member.

35. The coupling of claim 28, wherein the coupling is configured to attach the connector to a child seat.

36. The coupling of claim 26, wherein said spring is a coiled compression spring.

37. The coupling of claim 26, wherein the frame further includes a plate mounted on each side of said lever.

38. The coupling of claim 37, wherein at least one of said plates is configured to at least partially define said mouth.

39. The coupling of claim 37, wherein said frame is a monolithic structure.

40. A coupling for attachment to an anchor member, the coupling comprising:
- a flame having a distal end defining a mouth configured to receive the anchor member and a proximal end defining an anchor aperture configured to attach the coupling to a child seat;
- a lever movably mounted to said frame and having an open position to allow the anchor member to be received within the mouth and a normally closed position prior to attachment to the anchor member which retains the anchor member therein;
- a spring acting between said frame and said lever to urge said lever into the closed position; and
- a manipulation member in communication with the lever to move the lever between the open position and the normally closed position;
- wherein the lever may be moved to the open position by forcing the anchor member into and through said lever when said lever is in said closed position.

41. The coupling of claim 40 further comprising a flexible member attached at one end to the anchor aperture and at the other end to the child seat.

42. A coupling for attachment to an anchor member, the coupling comprising:
- a frame having a proximal end and a distal end, the distal end of said frame including a mouth having a seat configured to receive the anchor member;
- a lever movably mounted to said frame, said lever having a proximal end and a distal end, said distal end including a finger and said proximal end including an engagement portion; said distal end of said lever extending beyond the seat of the notch in said frame; wherein said lever has a closed position wherein said finger substantially covers the mouth and an open position wherein said finger is substantially removed from the mouth;
- a stop member provided on said frame configured to engage said engagement portion to resist the movement of said lever from said closed position to said open position; and
- a biasing member acting between said frame and said lever; said biasing member urging said stop member and said engagement portion into engagement;
- wherein said lever moves rectilinearly relative to said frame.

43. The coupling of claim 42, wherein said lever moves both pivotally and rectilinearly relative to said frame.

44. A coupling for attachment to an anchor member, the coupling comprising:
- a frame having a distal end defining a mouth configured to receive the anchor member, the frame including an anchor aperture which receives a connector comprising a length of web;
- a lever movably mounted to said frame and having an open position to allow the anchor member to be received within the mouth and a closed position to retain the anchor member within the mouth;
- a stop member provided on said frame; and
- a biasing member urging the stop member and the lever into engagement such that said stop member resists movement of said lever from said closed position to said open position.

45. The coupling of claim 44, wherein said length of web is operatively coupled to a web adjuster.

46. A coupling for attachment to an anchor member, the coupling comprising:
- a frame having a proximal end and a distal end, the distal end of said frame including a mouth having a seat configured to receive the anchor member, the frame further including an anchor aperture to receive a connector comprising a length of web;
- a lever movably mounted to said frame, said lever having a proximal end and a distal end, said distal end including a finger and said proximal end including an engagement portion; said distal end of said lever extending beyond the seat of the notch in said frame; wherein said lever has a norm ally closed position wherein said finger substantially covers the mouth and an open position wherein said finger is substantially removed from the mouth;
- a stop member provided on said frame configured to normally engage said engagement portion to resist the movement of said lever from said normally closed position to said open position; and
- a biasing member acting between said frame and said lever; said biasing member normally urging said stop member and said engagement portion into engagement.

47. The coupling of claim 46, wherein said length of web is operatively attached to a web adjuster.

* * * * *